United States Patent [19]
Yokonuma et al.

[11] Patent Number: 5,701,529
[45] Date of Patent: Dec. 23, 1997

[54] INFORMATION RECORDING APPARATUS

[75] Inventors: Norikazu Yokonuma, Yokohama; Kazuyuki Kazami, Tokyo; Youichi Yamazaki; Hideo Hibino, both of Kawasaki, all of Japan

[73] Assignee: Nikon Corporation, Tokyo, Japan

[21] Appl. No.: 715,360

[22] Filed: Sep. 12, 1996

Related U.S. Application Data

[63] Continuation of Ser. No. 204,511, Mar. 2, 1994, abandoned.

[30] Foreign Application Priority Data

| Mar. 3, 1993 | [JP] | Japan | 5-042798 |
| Mar. 11, 1993 | [JP] | Japan | 5-051056 |
| Mar. 17, 1993 | [JP] | Japan | 5-057404 |
| Mar. 17, 1993 | [JP] | Japan | 5-057405 |

[51] Int. Cl.$^6$ ............................................. G03B 17/24
[52] U.S. Cl. ............................................. 396/310; 396/319
[58] Field of Search ................................ 354/75, 76, 109, 354/105, 106, 289.12, 21; 355/40; 396/207, 208, 310, 311, 318, 319, 321

[56] References Cited

U.S. PATENT DOCUMENTS

| 4,714,962 | 12/1987 | Levine | 358/209 |
| 5,103,250 | 4/1992 | Arifuku et al. | 354/106 |
| 5,130,728 | 7/1992 | Goto et al. | 354/105 |
| 5,229,810 | 7/1993 | Cloutier et al. | 355/40 |
| 5,307,099 | 4/1994 | Kawamura et al. | 354/21 |
| 5,432,570 | 7/1995 | Ueda et al. | 354/105 |
| 5,465,133 | 11/1995 | Aoki et al. | 354/442 |

FOREIGN PATENT DOCUMENTS

| 58-24133 | 2/1983 | Japan | 354/109 |
| 5197010 | 8/1993 | Japan | 354/109 |

*Primary Examiner*—Safet Metjahic
*Assistant Examiner*—Christopher E. Mahoney
*Attorney, Agent, or Firm*—Oliff & Berridge

[57] ABSTRACT

An information recording apparatus according to the present invention includes: a feeding unit which feeds a film in a film cartridge, a reading device for reading information about each frame of the film. The information is stored in an external storage unit. A recording unit records information on a recording region corresponding to each frame of the film; and a recording control device controls the feeding unit so as to feed the film and controls the recording unit so as to, in synchronization with feeding of the film, record the information about each frame read by the reading device on the corresponding recording region of each frame of the film.

15 Claims, 27 Drawing Sheets

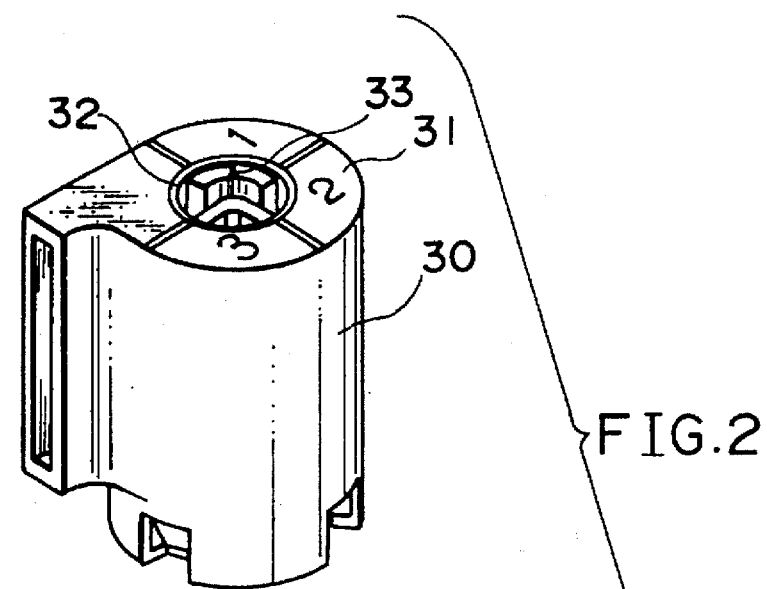
FIG.2
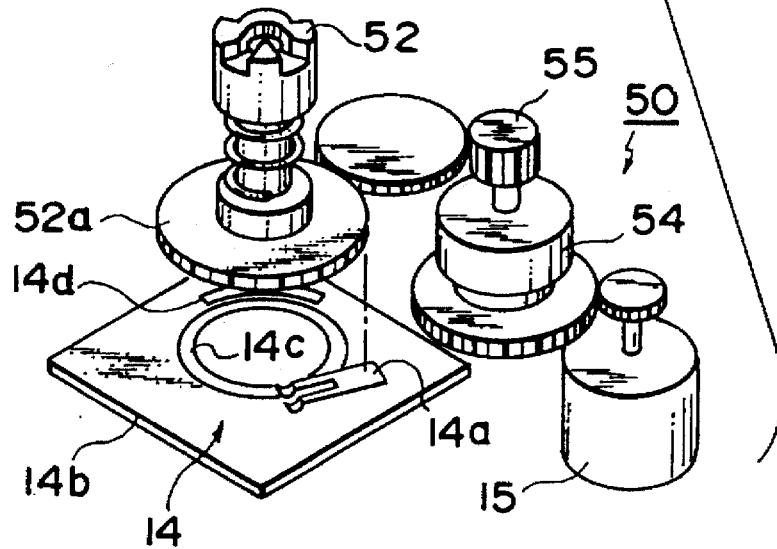
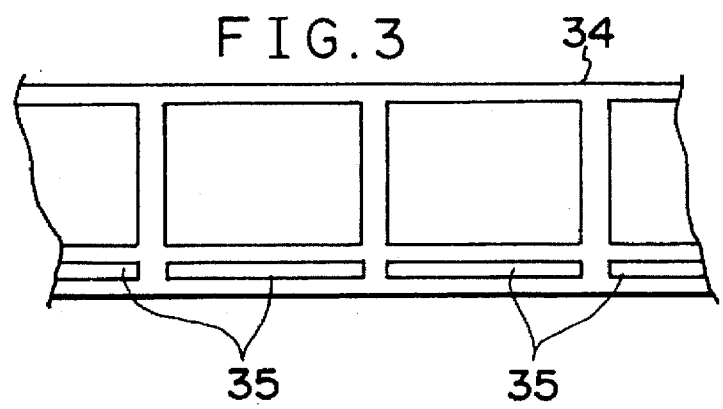
FIG.3

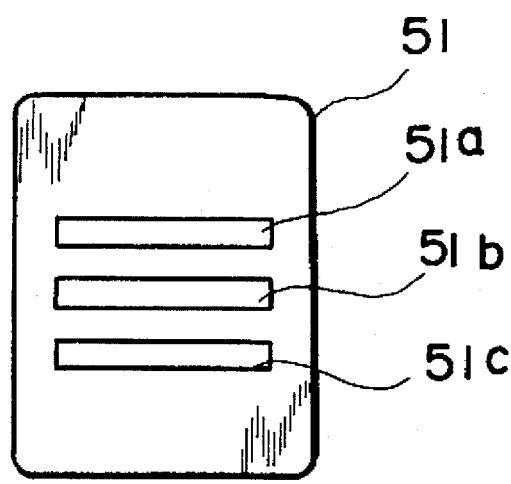
FIG. IIA
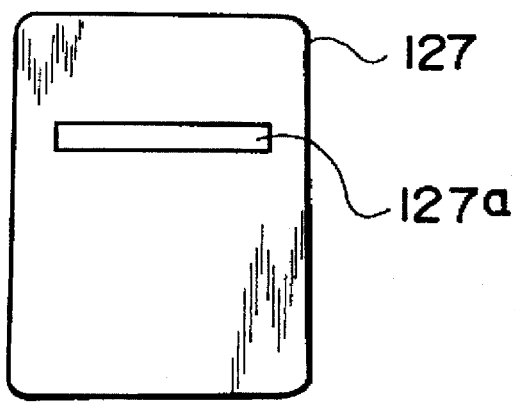
FIG. IIB

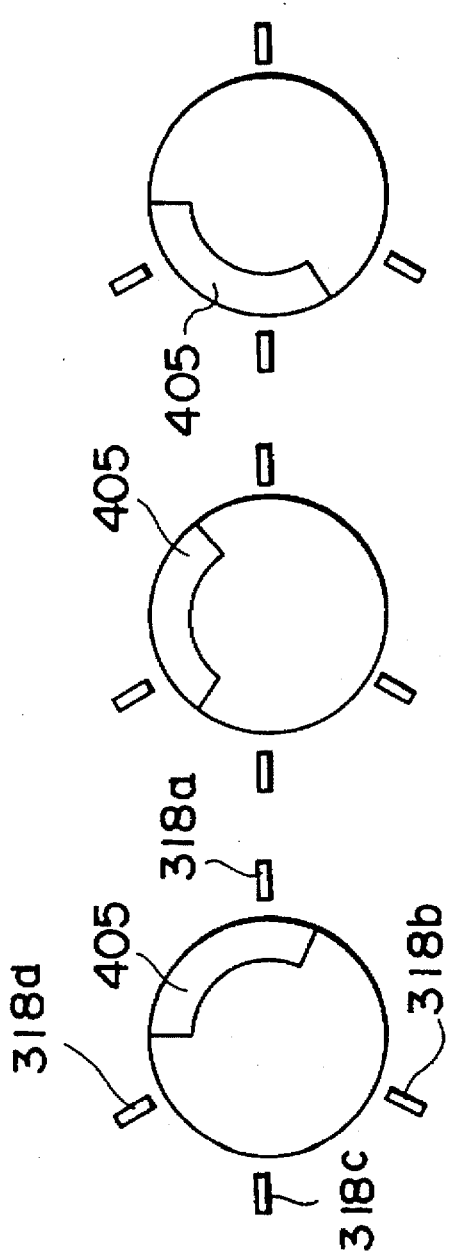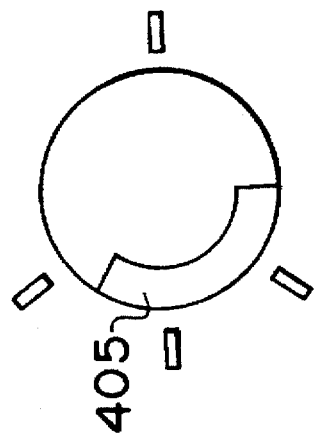

INFORMATION RECORDING APPARATUS

This is a Continuation of application Ser. No. 08/204,511 filed Mar. 2, 1994, now abandoned.

BACKGROUND OF THE INVENTION

1. Field of the Invention

The present invention relates to an information recording apparatus capable of recording information on a film photographed by a camera.

2. Related Background Art

U.S. Pat. No. 5,229,810 has disclosed a camera using a film having magnetic tracks corresponding to photographing frames thereof and capable of recording information about photography, such as the date of photography and information about exposure, on the magnetic tracks. The camera has a magnetic head for recording information on the magnetic track of the film. Information about the photography is recorded on the magnetic track in synchronization with advancing of the frame of the film after photography. The recorded information is read in a laboratory or the like, so that information is, in the form of characters, printed on the reverse side of the print for example.

However, the magnetic recording process to be performed in a camera requires for each camera to have a magnetic recording apparatus, and accordingly the size and the overall cost of the camera cannot be reduced. Therefore, the magnetic recording function cannot easily be employed in a lens shutter camera, the cost of which must significantly be reduced. Accordingly, users of the lens shutter cameras or old type cameras cannot make use of the convenient function of recording information on the film.

SUMMARY OF THE INVENTION

An object of the present invention is to provide an information recording apparatus capable of, in place of a camera, recording information on a film.

In order to achieve the foregoing object, an information recording apparatus according to the present invention comprises: a feeding unit which feeds a film in a film cartridge loaded in the information recording apparatus; reading means for reading information about each frame of the film, the information being stored in an external storage unit; a recording unit which records the information on a recording region corresponding to each frame of the film; and recording control means for controlling the feeding unit so as to feed the film and controlling the recording unit so as to, in synchronization with feeding of the film, record the information about each frame read by the reading means on the corresponding recording region of each frame of the film.

Use of the thus-arranged information recording apparatus, in place of the camera, enables information about each frame of the film stored, by the camera, in the storage unit to be recorded on the recording region of the film. Therefore, information can be recorded on a film photographed by a camera, for example, a lens shutter camera or an old type camera. In particular, a satisfactory economical advantage can be realized for a user of a type using a plurality of cameras to meet the purposes of the user because the necessity for each camera to have the information recording function can be eliminated.

According to another aspect of the present invention, there is provided an information recording apparatus comprising: the feeding unit; the reading means; the recording unit; the recording control means; a photographing lens; an exposure control unit that introduce light of an object which has passed through the photographing lens to the film so as to perform exposure in response to a release operation; mode setting means for setting any one of a photographing mode or a recording mode in accordance with a mode operation of a mode operating member; operation control means for, when the photographing mode is being set, operating the exposure control unit to perform a photographing process and operating the recording control means to record information on the frame exposed due to the photographing process, and when the recording mode is being set, operating the recording control means to record information read by the reading means on the recording region of the film without performing the photographing operation; a loading inhibition unit capable of switching the state between a first state where loading of a cartridge accommodating an unused film is permitted and loading of a cartridge accommodating a completely used film is inhibited and a second state where loading of a cartridge accommodating an unused film is inhibited and loading of a cartridge accommodating a completely used film is permitted; and a switch unit which maintains the loading inhibition unit at the first state when the photographing mode is being set and switching the loading inhibition unit to the second state when the recording mode is set, wherein the mode setting means sets the recording mode on condition that the reading means is able to read information from the external storage unit even if the mode operation member has been operated to set the photographing mode, and cancels the recording mode and sets the photographing mode after completion of recording information of each frame on the film by the recording control means when the recording mode is being set.

The information recording apparatus according to the present invention is able to have the photographing mode and the recording mode which can be set thereto. When the recording mode is set, information can also be recorded on the film exposed in another camera. If the photographing mode is set, the photographing operation can be performed similarly to the ordinary camera and information can be recorded on the film. When the photographing mode is being set, loading of a cartridge accommodating an unused film is permitted and loading of a cartridge accommodating a completely used film is inhibited. Therefore, the completely used film can be protected from double exposure. When the recording mode is being set, loading of a cartridge accommodating an unused film is inhibited and loading of a cartridge accommodating a completely used film is permitted. As a result, erroneous recording of information on the unused film can be prevented. The recording mode is canceled and the photographing mode is set respectively automatically after information has been recorded on the film when the recording mode is being set. So, there is no need of the operation of changing mode when photographing is performed with another film after information has been recorded on the film. Therefore, the handling facility can be improved.

According to another aspect of the present invention, there is provided an information recording apparatus comprising the feeding unit, the recording means; an internal storage unit which stores information read by the reading means; the recording unit; a reproducing unit which reproduces information recorded, by the recording unit, on the recording regions corresponding to the frames of the film; comparison means for comparing reproduced information with information stored in the internal storage unit to transmit a disagreement signal if reproduced information and stored information do not agree with each other; an alarm unit which issues an alarm in response to output of the disagreement signal; a re-recording operating member to be operated so as to again perform information recording; and recording control means for controlling the feeding unit and the recording unit so that, in synchronization with feeding of the film, the information for each frame stored in the internal storage unit is recorded on the recording region corresponding to each frame of the film, then operating the reproducing unit and the comparison means, and controlling the feeding unit and the recording unit to again perform information recording if the re-recording operating member is operated when an alarm is being issued in response to the disagreement signal.

The information recording apparatus according to the present invention records, on the film, information stored in the storage means, and reproduces the information so as to compare the reproduced information with the information stored in the storage means. If they do not agree with each other, that is, if an error takes place in the recording process, this fact is alarmed. If the user operates the re-recording operating member in response to the alarm, information can be again recorded. As a result, a problem that the cartridge having erroneous information recorded on the film therein is ejected can be prevented.

BRIEF DESCRIPTION OF THE DRAWINGS

FIG. 2 is a perspective view which illustrates the structure of a film feeding mechanism and a fork encoder of the lens shutter camera;

FIG. 3 is a view which illustrates a film;

FIGS. 11A and 11B are views which illustrate a magnetic head of the single lens reflex camera and that of the lens shutter camera;

FIGS. 23A to 23D are views which illustrate the arrangement of the loading inhibition mechanism and the positions of cut portion corresponding to the state of use of the film;

DETAILED DESCRIPTION OF THE PREFERRED EMBODIMENTS

First Embodiment

Referring to FIGS. 1 to 8, a first embodiment of the present invention will now be described.

Figure 1:
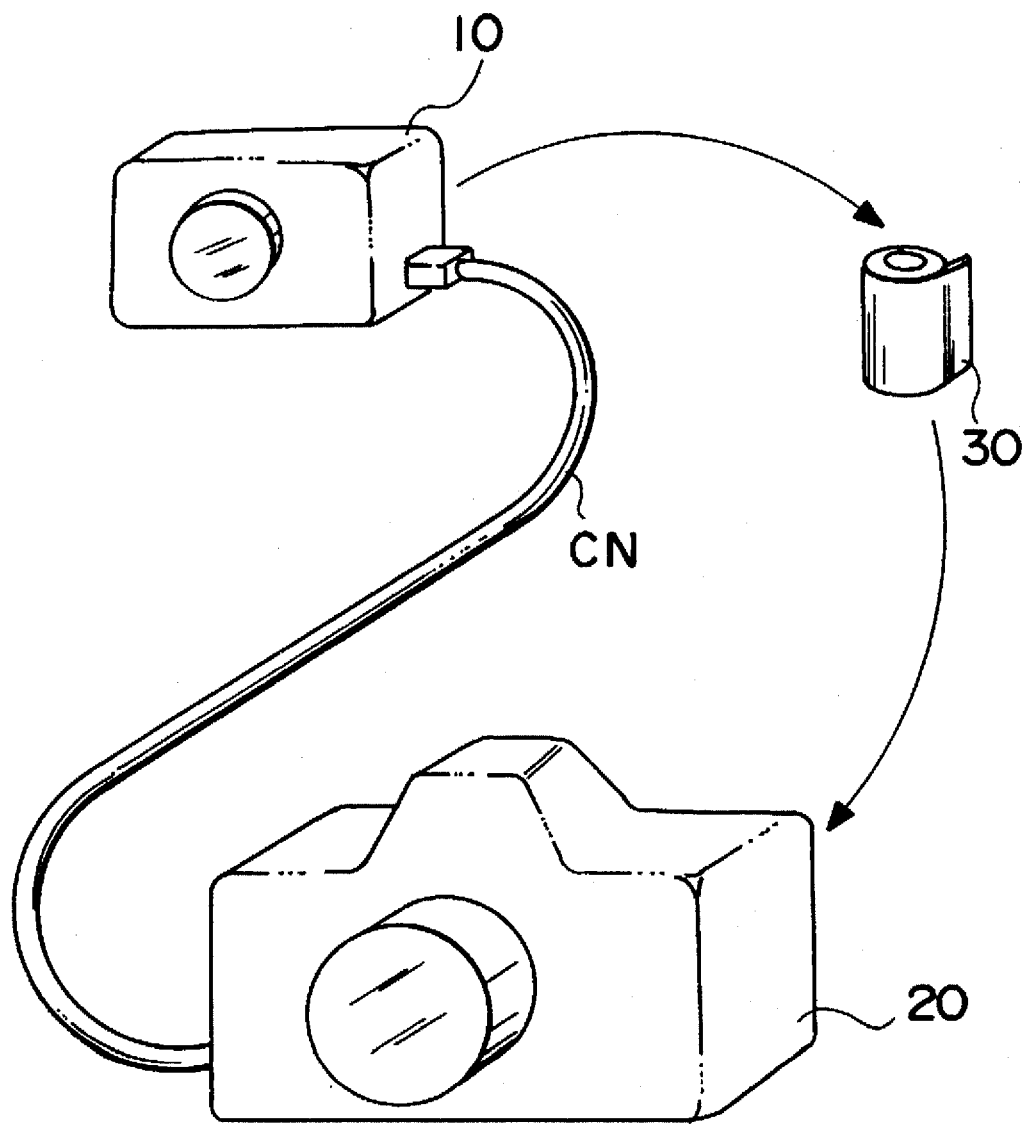
FIG. 1 is a view which illustrates a state where a lens shutter camera is connected to a single lens reflex camera according to a first embodiment of the present invention.

Referring to FIG. 1, reference numeral 10 represents a lens shutter camera, 20 represents a single lens reflex camera serving as an information recording apparatus to be connected to the lens shutter camera 10 by a connector CN, and 30 represents a film cartridge.

<Structure of the Cartridge>

The cartridge 30 has, similarly to those disclosed in U.S. patent application Ser. No. 728,208 (filed on Jul. 10, 1991) or U.S. patent application Ser. No. 112,479 (filed on Aug. 27, 1993), a mechanism 31 (see FIG. 2) for indicating the state of use of the film.

The "state of use of the film" to be indicated are:
(1) A fact that the subject film is an unused film, all frames of which have not been exposed; or
(2) A fact that the subject film is an partially used film, a portion of the frames of which has been exposed, or
(3) A fact that the subject film is a completely used film, all frames of which have been exposed.

In order to indicate the state of use of the film, the top surface of the cartridge 30 is divided into four regions as shown in FIG. 2. Among the four regions, three regions respectively have indication symbols, such as "1", "2" and "3", for indicating the states of use of the film, the indication symbols being, for example, printed on the foregoing regions. On the other hand, an indicator 33 is disposed which is rotated when a spool shaft 32 of the cartridge 30, around which the film is wound, is rotated. Corresponding to the position of the spool shaft 32 which is stopped, one of the indication symbols is indicated with the indicator 33. In this embodiment, the state where the indication symbol "1" is indicated shows that the film is a unused film, the state where the indication symbol "2" is indicated shows that the film is a partially used film, and the state where the indication symbol "3" is indicated shows that the film is a completely used film.

A film 34 accommodated in the cartridge 30 has magnetic tracks 35 which correspond to the frames as shown in FIG. 3. Information about photography such as information about the date of the photography and the exposure value can be magnetically recorded on each magnetic track 35.

<Structure of the Lens Shutter Camera>

Figure 4:
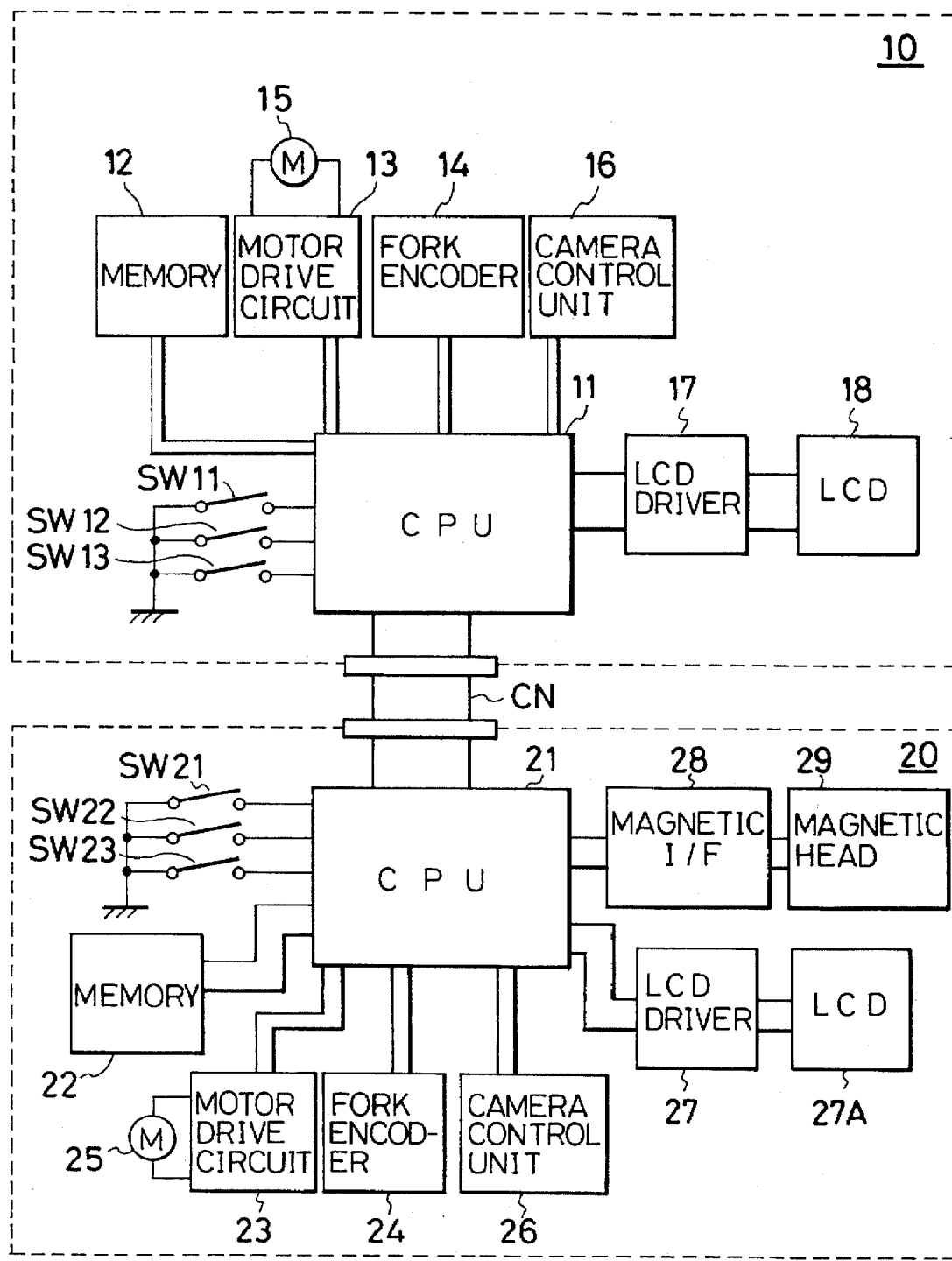
FIG. 4 is a block diagram which illustrates the control system of the single lens reflex camera and the lens shutter camera.

The lens shutter camera 10 includes a CPU 11 as shown in FIG. 4. The following elements are connected to the CPU 11: a memory 12 for storing photography information about each frame of the film; a motor drive circuit 13 for driving a film feeding motor 15; a fork encoder 14 for detecting the state of use of the film; a camera control unit 16 for operating a diaphragm and a shutter (omitted from illustration) to perform photography; and an LCD driver 17 that operates a liquid crystal display unit (an LCD) 18 disposed on the surface of the camera to indicate a variety of information items.

FIG. 2 illustrates the structure of the fork encoder 14 and that of the film feeding mechanism 50.

A fork 52 is engaged to the spool shaft 32 of the cartridge 30 so that the fork 52 is rotated by the film feeding motor 15 via a reduction gear mechanism 55 having a clutch 54. As a result, the spool shaft 32 is rotated integrally with the fork 52 so that the film 34 is delivered from the cartridge 30 or rewound to the cartridge 30. The feeding motor 15 rotates a winding spool (omitted from illustration) disposed in the camera 10 through a gear train (omitted from illustration) so that the film delivered from the cartridge 30 is wound around the winding spool. The clutch 54 separates the fork 52 and the motor 15 from each other at the time of winding the film after the film has been delivered.

The fork encoder 14 comprises a brush 14a which is rotated integrally with a fork gear 52a, a common pattern 14c formed on a base plate 14b, and a segment pattern 14d also formed on the base plate 14b. When the indicator 33 of the spool shaft 32 indicates "3", that is, an indication of a completely used film is made, the brush 14a contacts with the segment pattern 14d.

Referring to FIG. 4, the following elements are connected to the CPU 11: a mode switch SW11 for switching the mode between a photographing mode and a recording mode to be described later, a release switch SW12 to be switched on in synchronization with the operation of a release button (omitted from illustration), and an intermediate rewinding switch SW13 for rewinding the film 34 before all frames of the film 34 are exposed. The photographing mode is a mode for performing an ordinary photography, while the recording mode is a mode in which the foregoing photography information is recorded on the film 34 in the single lens reflex camera. The lens shutter camera 10 has not a magnetic head to be described later.

<Structure of Single Lens Reflex Camera 20>

The single lens reflex camera 20 includes a CPU 21. The CPU 21 can be connected to the CPU 11 of the lens shutter camera 10 by the connector CN. The following elements are connected to the CPU 21: a memory 22 for storing the photography information; a motor drive circuit 23 for rotating a film feeding motor 25; a fork encoder 24; a camera control unit 26; a driver 27 for actuating an LCD 27A; a mode switch SW21; a release switch SW22; and an intermediate rewinding switch SW23.

Figure 5:
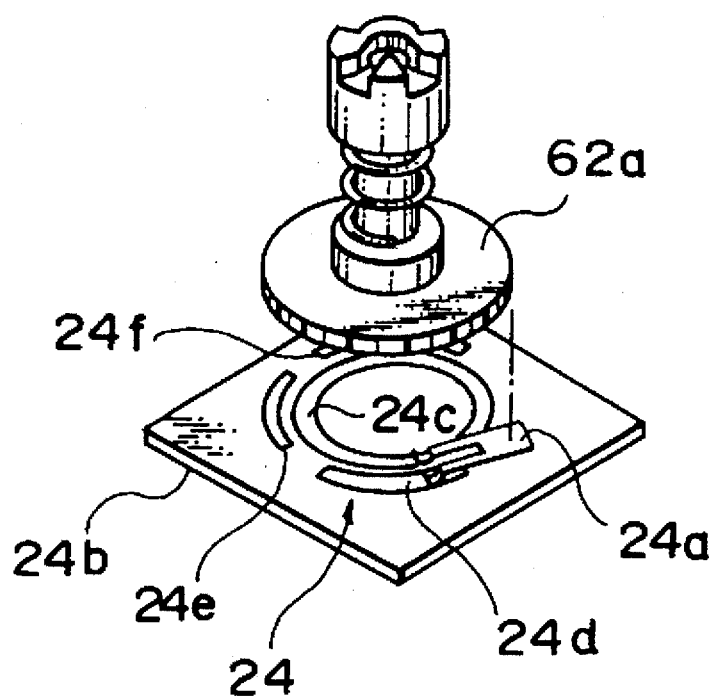
FIG. 5 is a perspective view which illustrates the structure of a fork encoder of the single lens reflex camera.

Although the structure of a film feeding mechanism of the single lens reflex camera 20 is formed similarly to that shown in FIG. 2, the fork encoder 24 somewhat differs from that shown in FIG. 2. That is, the fork encoder 24, as shown in FIG. 5, comprises a brush 24a which is rotated integrally with a fork gear 62a; a common pattern 24c formed on a base plate 24b; and segment patterns 24d, 24e and 24f also formed on the base plate 42b. When the indicator 33 of the spool shaft 32 indicates "1", "2", "3", the brush 24a contacts with the segment pattern 24d, 24e, 24f respectively.

Further, a magnetic head 29 is, as shown in FIG. 4, connected to the CPU 21 via a magnetic interface 28 to enable photography information transmitted from the CPU 11 of the lens shutter camera 10 to be recorded on the magnetic track 35 of the film 34.

<Description of the Operation>

Referring to FIGS. 6A to 8, the operation of this embodiment will now be described.

(1) Operation of the Lens Shutter Camera 10

Figure 6A:
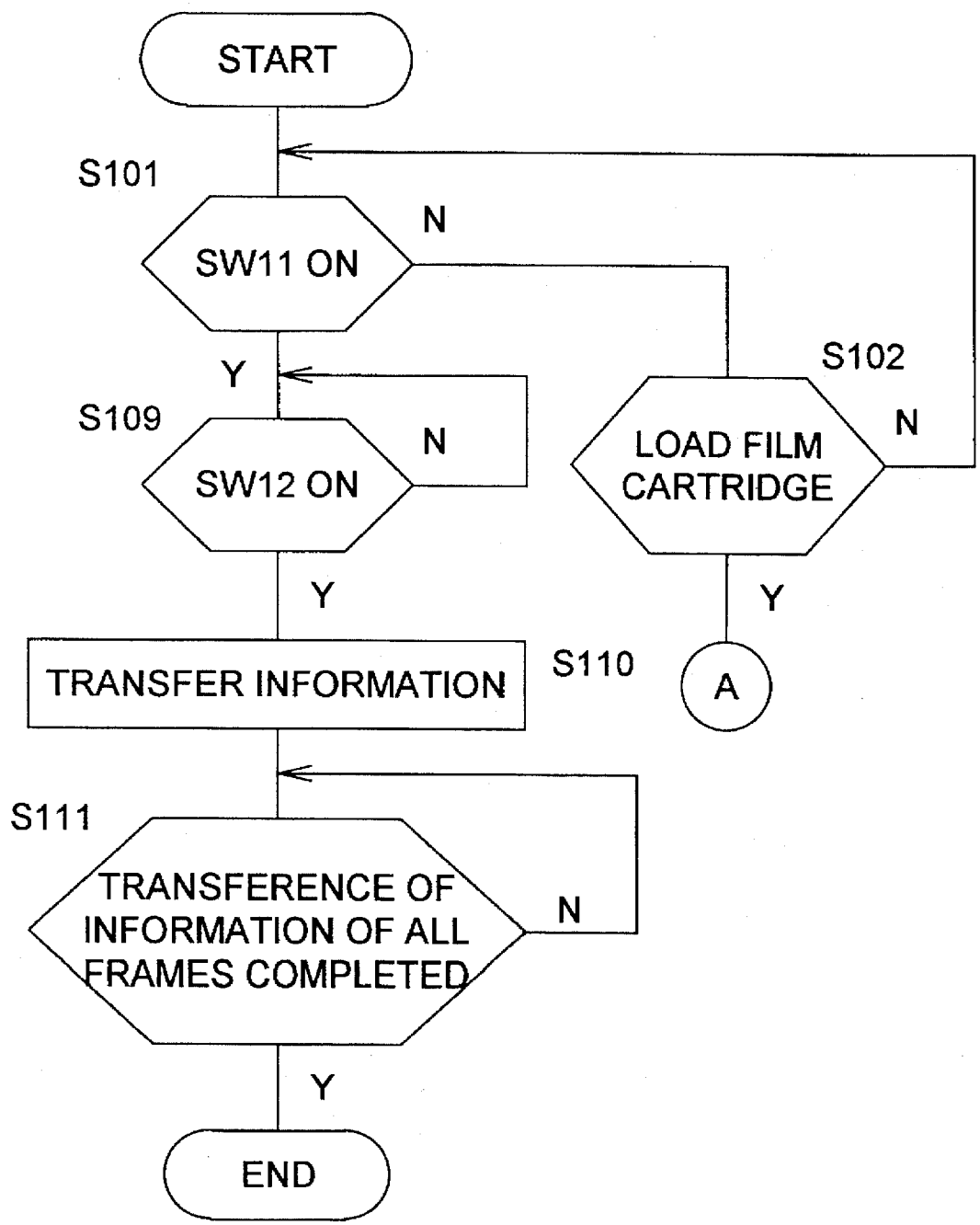
FIGS. 6A and 6B are flow charts of the operation to be performed in the lens shutter camera.
Figure 6B:
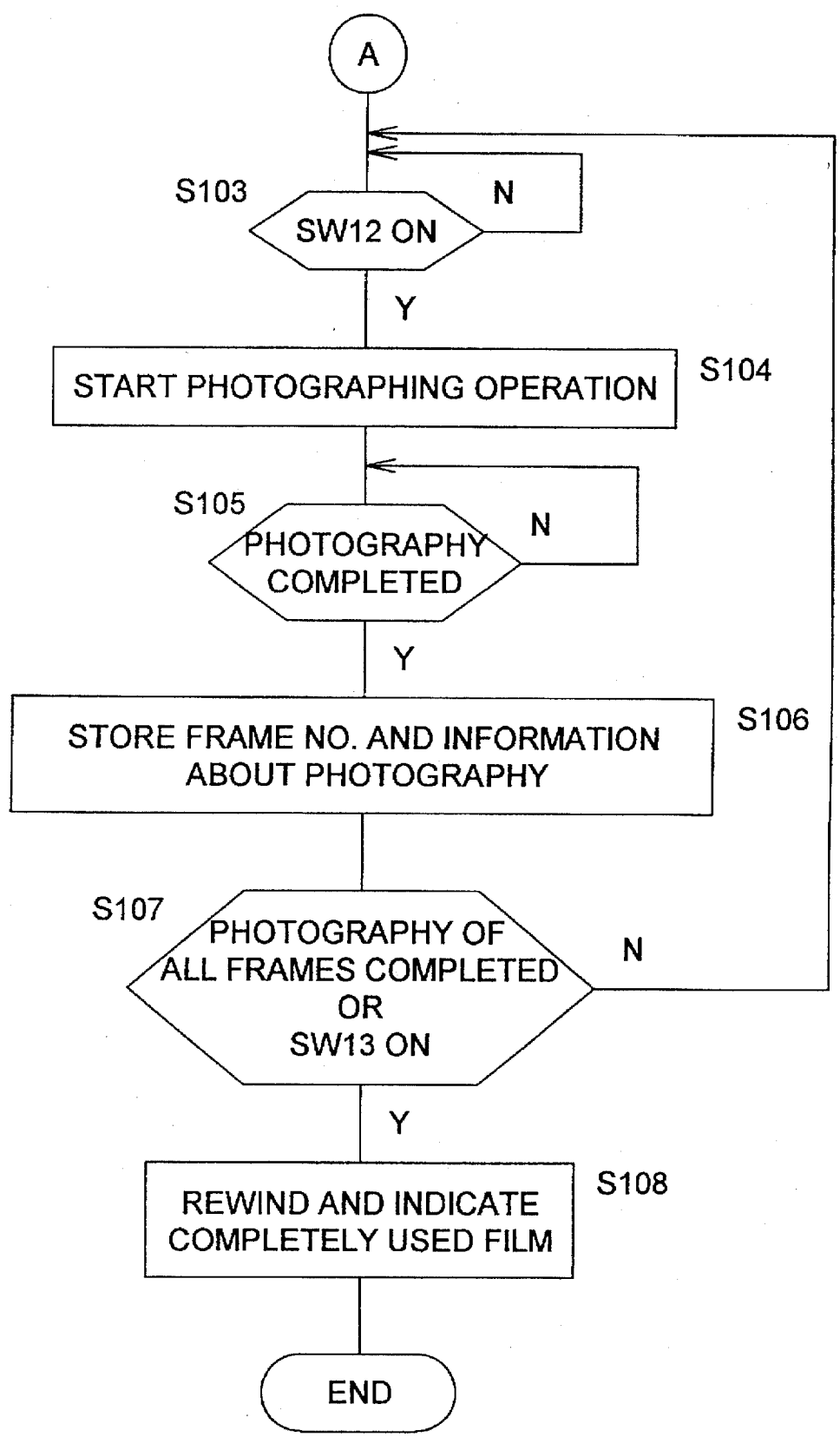

FIGS. 6A and 6B illustrate the control process performed by the CPU 11 of the lens shutter camera 10. First, in step S101, a discrimination is made that the mode switch SW11 has been switched on or off, that is, the set mode is the photographing mode or the recording mode. If the switch SW11 has been switched off, that is, if the photographing mode has been set, the flow proceeds to step S102 in which a discrimination is made whether or not the film cartridge 30 has been loaded. If the film cartridge 30 has not been loaded, the flow returns to step S101. If the film cartridge 30 has been loaded, the flow proceeds to step S103. In step S103, a moment the release switch SW12 is switched on is waited for. If the release switch SW12 has been switched on, the photographing operation starts in step S104. The photographing operation is composed of an operation for operating the diaphragm and the shutter by means of the camera control unit 16 to expose the film 34 and an operation for forwards rotating the feeding motor 15 after the film 34 has been exposed so that the film 34 is wound forwards by one frame.

In step S105, the completion of the photographing operation is waited for. When the photographing operation has been completed, the following information items are collectively stored in the memory 12: count made by a film counter (omitted from illustration); and the photography information, such as date on which the frame was exposed and exposure information employed in the photographing operation performed in step S104. The count made by the film counter corresponds to the No. of the frame exposed in step S104. In step S107, a discrimination is made whether or not all frames have been exposed or the intermediate rewinding switch SW13 has been switched on. If a negative discrimination is made, that is, if there are one or more unused frames and the intermediate rewinding switch SW13 has not been switched on, the flow returns to step S103 and the foregoing process is repeated. If an affirmative discrimination is made in step S107, that is, if all frames have been exposed or if the intermediate rewinding switch SW13 has been switched on, the flow proceeds to step S108.

In step S108, the film feeding motor 15 is rotated inversely to rotate the spool shaft 32 of the film cartridge 30 in the rewinding direction via the fork 52 so that the film 34 is rewound. After the rewinding operation has been completed, the rewinding directional rotations are continued, and when it is detected that the brush 14a of the fork encoder 14 has contacted with the segment pattern 14d, the rotation of the motor 15 is stopped. As a result, the indication mechanism 31 of the film cartridge 30 indicates the completely used film. That is, the indicator 33 of the spool shaft 32 indicates "3".

If a discrimination has been made in step S101 that the mode switch SW11 has been switched on, that is, if the recording mode is being set, the moment the release switch SW12 is switched on is waited for in step S109. If the release switch SW12 has been switched on, the flow proceeds to step S110. In step S110, communication is performed with the CPU 21 of the single lens reflex camera 20 to collectively transfer, to the CPU 21, the frame No. of the exposed frame and the photography information stored in the memory 12. In step S111, a moment information about all frames has been transferred is waited for. If the transference has been completed, the process is completed here.

In order to perform the communication with the CPU 21 of the single lens reflex camera 20, the lens shutter camera 10 and the single lens reflex camera 20 must be connected to each other through the connector CN and the recording mode must be as well as set on the single lens reflex camera 20.

In accordance with the process shown in FIGS. 6A and 6B, setting of the photographing mode in the lens shutter camera 10 causes the photographing operation to be performed ordinarily whenever the release switch SW12 is switched on. Further, the frame No. of the exposed frame and the photography information are collectively stored in the memory 12. Since the lens shutter camera 10 has no magnetic head, it is not performed, at the time of performing photography, to record the photography information on the magnetic track 35 of the film 34 in the lens shutter camera.

After all frames of the film have been exposed or after the intermediate rewinding switch SW13 has been switched on, the film 34 is rewound, and then the indication mechanism 31 of the cartridge 30 indicates the completely used film regardless of the actual state of use of the film. That is, the lens shutter camera 10 does not perform a complicated control of a type for detecting the actual state of use of the film to control the indication mechanism 31 of the cartridge.

(2) Operation of the Single Lens Reflex Camera

Figure 7:
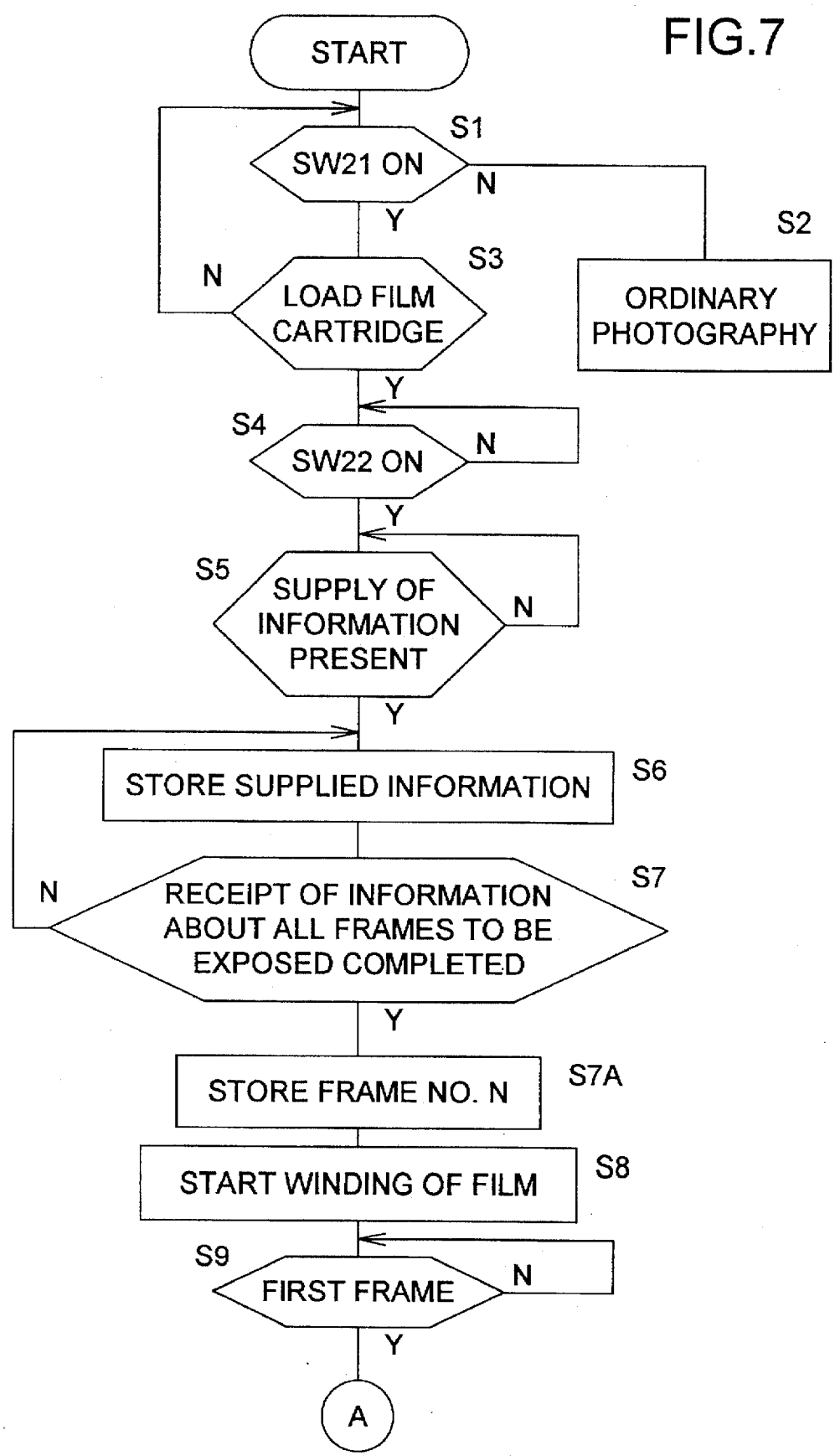
FIGS. 7 and 8 illustrate a flow chart of the operation to be performed in the single lens reflex camera.
Figure 8:
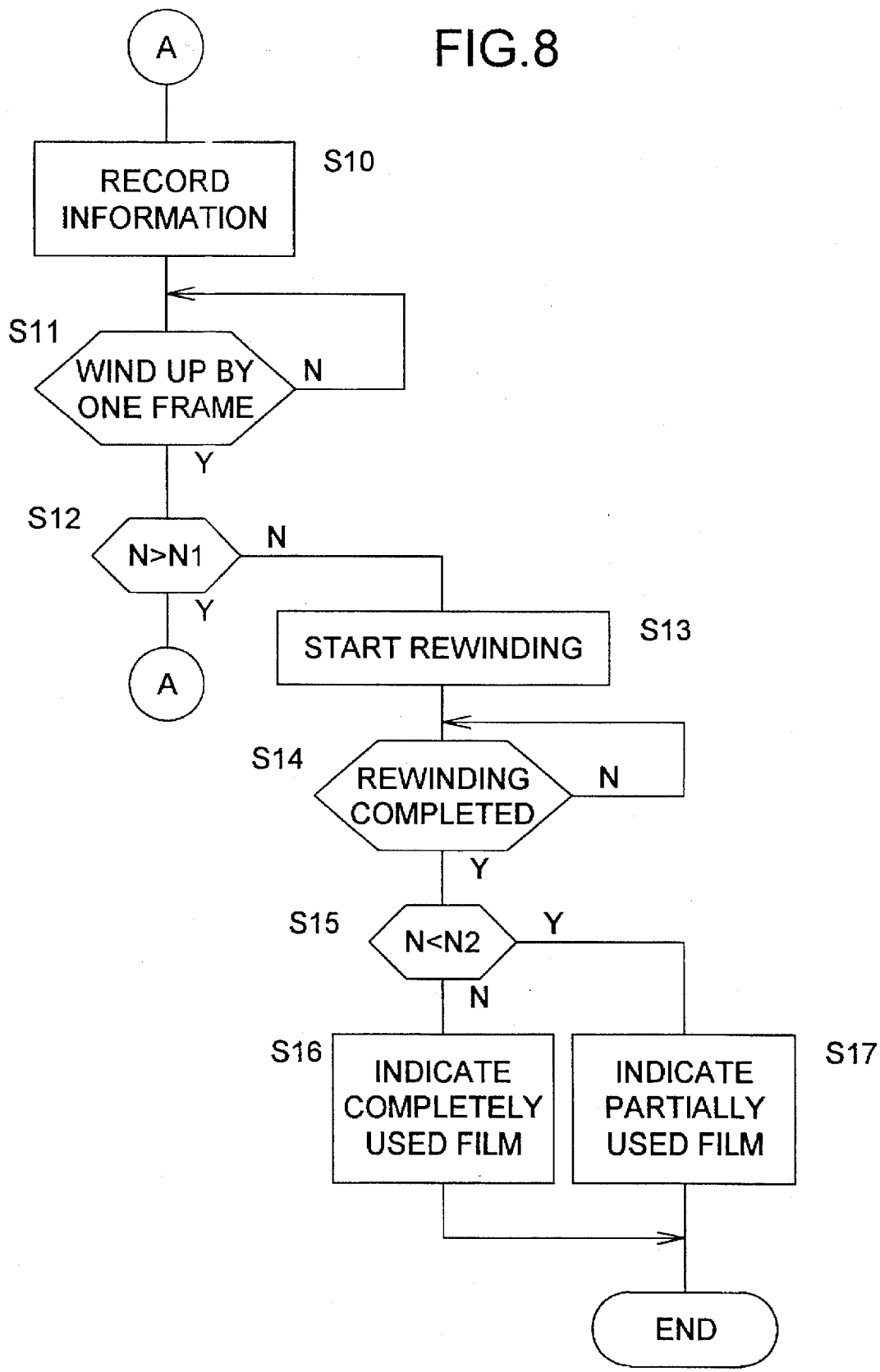

FIGS. 7 and 8 illustrate a control performed by the CPU 21 of the single lens reflex camera 20. In step S1, a discrimination is made whether or not the mode switch SW21 has been switched on, that is, a fact that the mode is the photographing mode or the recording mode. If the mode switch SW21 has been switched off, that is, if the photographing mode is being set, the flow proceeds to step S2 in which the ordinary photographing process is performed. Since the contents of the photographing process does not directly relate to the present invention, its detailed description is omitted here. Basically, the photographing operation is performed when the release switch SW22 has been switched on, and, in synchronization with an operation of winding one frame, the photography information is recorded on the magnetic track 35 of the film 34 by means of the magnetic head 29. In the lens shutter camera 10, the indication of the completely used film is made without exception after the film has been rewound as described in step S108. In the single lens reflex camera 20, an actual state of use of the film is discriminated and, in accordance with the result of the discrimination, the indication of the partially used film or that of the completely used film is made. The detailed contents of the foregoing indication process are the same as those to be performed in steps S15 to S17 shown in FIG. 8, and their description will be made later.

If a discrimination is made in step S1 that the mode switch SW21 has been switched on, that is, if the recording mode has been set, the flow proceeds to step S3 in which a discrimination is made whether or not the film cartridge 30 has been loaded. If the film cartridge 30 has not been loaded, the flow returns to step S1. If the same has been loaded, the flow proceeds to step S4. The cartridge to be loaded in the recording mode is the cartridge immediately after pictures have been photographed in the lens shutter camera 10.

In step S4, a moment the release switch SW22 is switched on is waited for. When the release switch SW22 has been switched on, supply of information (the frame No. and the photography information about the frame) from the CPU 11 of the lens shutter camera 10 is waited for in step S5. After the information has been supplied, the information is stored on the memory 22 in step S6. The contents of step S6 are repeated until a discrimination is made in step S7 that information about all frames has been stored. Then, the flow proceeds to step S7A.

In step S7A, the frame No. of the final frame among information items about the stored frame Nos. is stored in a variable N as number of the photographed frames. The variable N is "36" in a case where all frames of a 36-exposure film have been exposed, while the variable N is "20" in a case where 20 frames of the 36-exposure film have been exposed.

In next step S8, the feeding motor 15 is rotated forwards by means of the motor drive circuit 13 to commence the film winding operation. In step S9, a moment the first frame faces the aperture is waited for. When the first frame has faced the aperture, the flow proceeds to step S10 shown in FIG. 8.

In step S10, information about one frame is read from the memory 22. Further, the magnetic head 29 is operated by the magnetic interface 28 to record the read information on the magnetic track 35 of the corresponding frame of the film 34. In this embodiment, the magnetic head 29 is positioned so that, during a period the frame being faced the aperture is moved by the film winding, the magnetic head 29 records information on the magnetic track 35 of the moving frame.

In step S11, a moment one frame of the film is wound, that is, a moment the next frame faces the aperture, is waited for. When the next frame faces the aperture, the flow proceeds to step S12. In step S12, frame No. N1 which is the number of the frame on which information has been recorded immediately before is compared with the number N which is the number of the photographed frames stored in step 7A. Frame No. N1 is, for example, used the count of a film counter omitted from illustration. If N>N1, a discrimination is made that one or more frames on which no information has been recorded are present, and the flow returns to step S10. If N<N1, a discrimination is made that information has been recorded on all frames, and the flow proceeds to step S13.

In step S13, the feeding motor 15 is rotated inversely to commence an operation of rewinding the film. The completion of the rewinding operation is waited for in step S14. After the rewinding operation has been completed, a number N2 which is the number of all frames of the film which can be exposed is compared with the number N which is the number of the exposed frames. The number N2 may be a value read from DX code of the cartridge 30. If the film is a 36-exposure film, N2 is 36. If the film is a 24-exposure film, N2 is 24. If N<N2, a discrimination is made that the subject film is a partially used film, and the flow proceeds to step S17 in which the indication of the partially used film is made. That is, when it is detected that the brush 24a of the fork encoder 24 contacts with the segment pattern 24e, the rotation of the feeding motor 15 is stopped. As a result, the indicator 33 of the spool shaft 32 indicates "2".

If N≧N2, a discrimination is made that the subject film is a completely used film, and the flow proceeds to step S16 in which the indication of the completely used film is made. That is, when it is detected that the brush 24a of the fork encoder 24 contacts with the segment pattern 24f, the rotation of the motor 15 is stopped. As a result, the indicator 33 of the spool shaft 32 indicates "3".

According to the first embodiment of the present invention, the lens shutter camera 10 is connected to the single lens reflex camera 20 by means of the connector CN, the cartridge 30 which accommodates a film exposed in the lens shutter camera 10 is loaded into the single lens reflex camera 20, and the cameras 10 and 20 are set to the recording mode. Then, the following control is performed when the release switches SW12 and SW22 have been switched on.

Information (frame No. and photography information) about each frame stored in the memory 12 of the lens shutter camera 10 is transmitted to the single lens reflex camera 20 through the CPU 11, the information being then stored in the memory 22 through the CPU 21. Then, the film 34 is wound up, and information about each frame in the memory 22 is, in synchronization with the winding operation, recorded on the magnetic track 35 of the corresponding frame.

After information of all frames has been recorded, the film 34 is rewound, and the number N which is the number of the photographed frames is compared with the number N2 which is the number of the frames of the film that can be exposed. As a result of the comparison, the state of use of the film is discriminated. If the film is discriminated as partially used film, the indication of the partially used film is made. If the film is discriminated to be completely used film, the indication of the completely used film is made. The cartridge, which has been indicated as the partially used film, can be again loaded and used in a camera of a type having a function for detecting an unexposed frame to expose it.

As described above, the single lens reflex camera 20 according to this embodiment records, in place of the lens shutter camera 10, information about each frame of the film stored in the lens shutter camera 10 on the magnetic track 35 of the film. Further, the actual state of use of the film is detected to control the indication mechanism 31 of the cartridge 30 so that the state of use of the film is indicated. Therefore, information about the film in a cartridge exposed in the low-cost lens shutter camera 10 or an old type camera, which does not have the magnetic recording function and the film use state indication control function, can be recorded on the film and the state of use can be indicated. In particular, possession of the foregoing single lens reflex camera 10 will realize a satisfactory economical advantage for a user of a type using a plurality of cameras to meet the purposes because the necessity for each camera to have the magnetic recording function and the film use state indicating function can be eliminated.

Although the foregoing embodiment is arranged in such a manner that the number N which is the number of the photographed frames and the number N2 which is the number of frames that can be exposed are subjected to a comparison to discriminate the state of use of the film, another arrangement may be employed in which information about photography recorded on the magnetic track is read by a reproducing head, and the state of use of the film is discriminated depending upon whether or not there is a frame on which no information about photography is recorded. Further, the structure of the mechanism of the cartridge for indicating the state of use of the film is not limited to the arrangement according to this embodiment. Although the employed indication mechanism is able to indicate the unused film, the partially used film and the completely used film, another mechanism may be employed which is capable of indicating the partially used film and the completely used film.

Second Embodiment

With reference to FIGS. 9 to 14, a second embodiment of the present invention will now be described.

As contrasted with the first embodiment comprising the lens shutter camera 10 which has no magnetic head, this embodiment has an arrangement that the lens shutter camera 10 comprises a magnetic head. However, the magnetic head of the lens shutter camera 10 according to this embodiment is able to record, on the magnetic tracks of the film, information in a small quantity. Therefore, a single lens reflex camera 20 must be used if a large quantity of information is intended to be recorded. Further, the single lens reflex camera 20 according to this embodiment has a function for preventing recording erroneous information.

Figure 9:
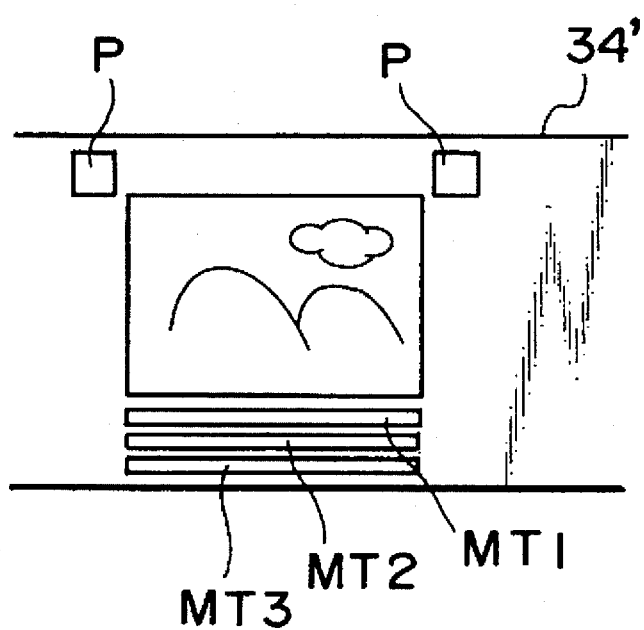
FIG. 9 is a view which illustrates a film according to a second embodiment.

A film 34' accommodated in a film cartridge (omitted from illustration) according to this embodiment has three magnetic tracks MT1, MT2 and MT3 to correspond to each frame to be exposed as shown in FIG. 9. Thus, information about photography (date of the photography, the exposure value or the focal distance of the photographing lens or the like) can be recorded. Symbol P represents perforations formed in such a manner that two perforations correspond to one frame. The mechanism for indicating the state of use of the film is omitted from the cartridge according to this embodiment.

Figure 10:
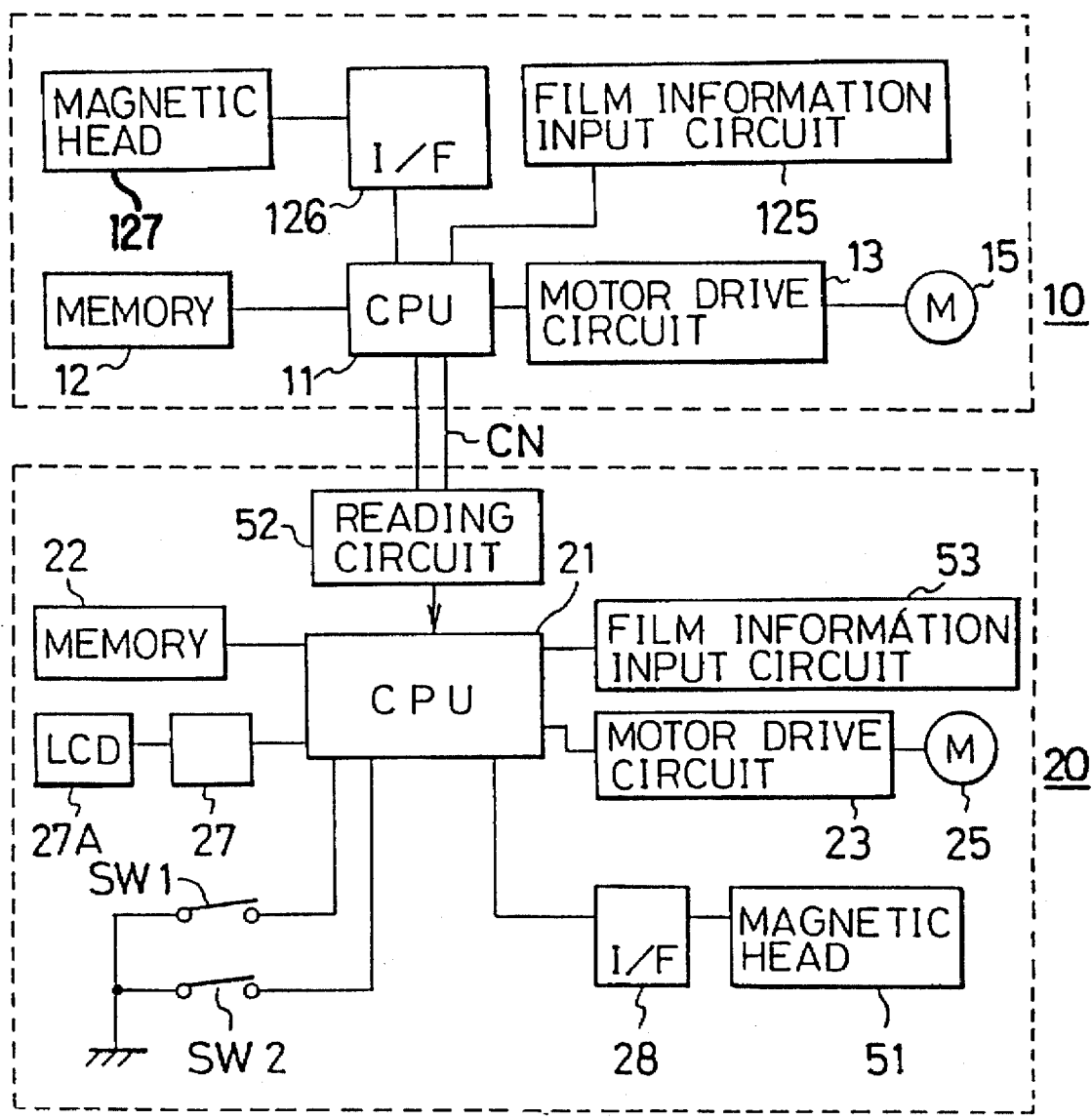
FIG. 10 is a block diagram which illustrates the control system of the single lens reflex camera and the lens shutter camera.

FIG. 10 is a block diagram which illustrates a control system according to this embodiment and comprising the lens shutter camera 10 and the single lens reflex camera 20. Similar elements to those shown in FIG. 4 are given the same reference numerals and the description will be made mainly about portions different from those shown in FIG. 4.

A magnetic head 127 is connected to the CPU 11 of the lens shutter camera 10 by a magnetic interface 126. The magnetic head 127, as shown in FIG. 11B, comprises only one recording head gap 127a to enable information to be recorded on the magnetic track MT3 of the magnetic film 34'. Further, a film information receiving circuit 125 for reading information about the film from the DX code of the cartridge is connected to the CPU 11.

On the other hand, a magnetic head 51 is connected to the CPU 21 of the single lens reflex camera 20 by the magnetic interface 28. The magnetic head 51, as shown in FIG. 11A, comprises head gaps 51a, 51b and 51c. The head gaps 51a to 51c are located to respectively be in contact with the magnetic tracks MT1 to MT3 of the film 34'. The two head gaps 51a and 51b are used only to record information in such a manner that they record information on the two magnetic tracks MT1 and MT2. The residual head gap 51c is enabled to record information on the magnetic track MT3 and reproduce information from the magnetic track MT3.

A reading circuit 52 for reading information from the lens shutter camera 10 and a film information receiving circuit 53 for reading information from the DX code of the cartridge are connected to the CPU 21. In addition, the mode selection switch SW1 and the recording start switch SW2 are connected to the CPU 21.

Since the indication of the state of use of the film is omitted from the arrangement of this embodiment, the fork encoder is omitted from both of the cameras 10 and 20.

The operation of this embodiment will now be described.
(1) Operation of the Lens Shutter Camera 10

The cartridge is loaded in the lens shutter camera 10 and a release button (omitted from illustration) is depressed. Whenever the release button is depressed, photography is performed and photography information, such as date of the photography, the exposure value employed in the photography and the focal distance of the photographing lens, is stored on the memory 12. After each frame has been exposed, the film 34' is wound up by one frame. In synchronization with the film winding operation, only the information representing the date of the photography among the foregoing information items is recorded on the magnetic track MT3 of the film 34' by the head gap 127a of the magnetic head 127.

(2) Operation of Single Lens Reflex Camera 20

A cartridge is loaded in the single lens reflex camera 20 and the photographing mode is set by operating the mode selection switch SW1. Whenever a release button is depressed, photography is performed and photography information, such as date of the photography, the exposure value employed in the photography and the focal distance of the photographing lens, is stored on the memory 22. In synchronization with the film winding operation to be performed after each frame has been exposed, all information items stored as described above are recorded on the magnetic tracks MT1 to MT3 by means of the head gaps 51a to 51c of the magnetic head 51.

Figure 12:
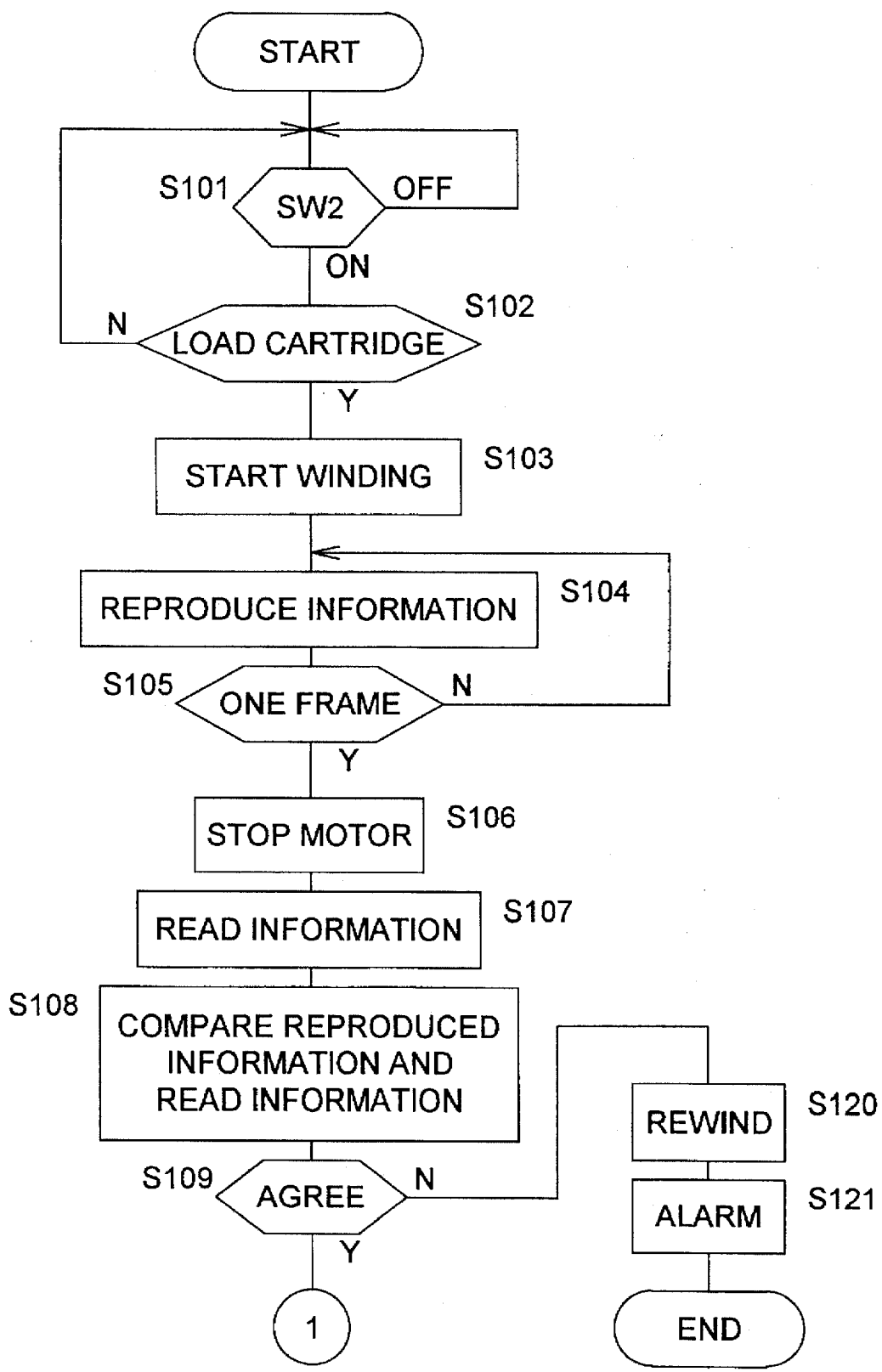
FIGS. 12 and 13 illustrate a flow chart of the operation of the second embodiment.
Figure 13:
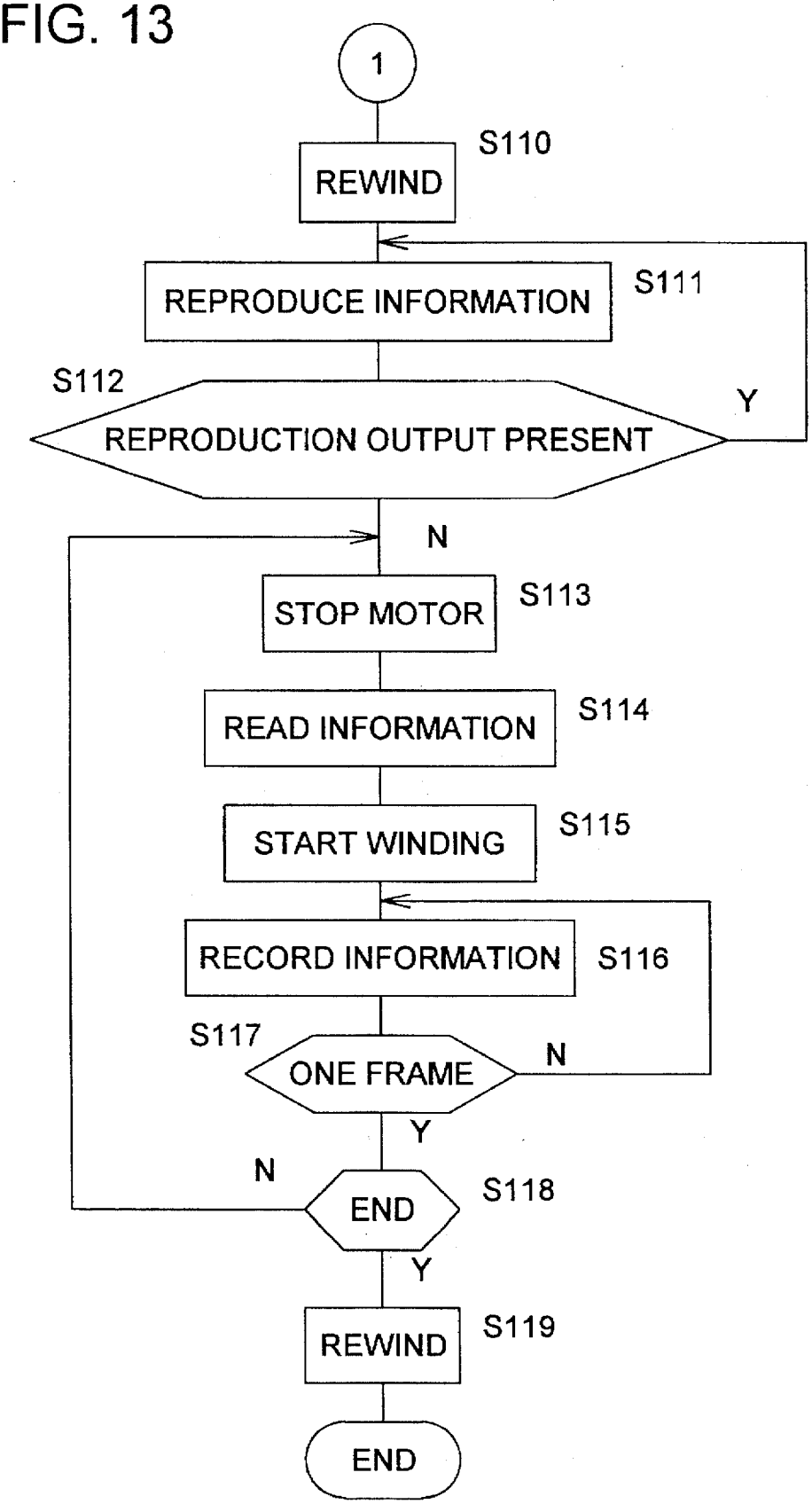

With reference to a flow chart shown in FIGS. 12 and 13, the control procedure to be performed by the CPU 21 of the single lens reflex camera 20 at the time of setting the recording mode will now be described. The lens shutter camera 10 has been connected by means of the connector CN.

When the recording mode has been set by the mode switch SW11, the program is commenced. In step S101, a moment the recording start switch SW2 is switched on is waited for. When it has been switched on, the flow proceeds to step S102. In step S102, a discrimination is made whether or not the cartridge has been loaded depending upon the state of a film presence switch (omitted from illustration). If the cartridge has not been loaded, the flow returns to step S101. If the same has been loaded, the flow proceeds to step S103.

In step S103, the feeding motor 25 is rotated forwards by means of the motor drive circuit 23 to commence winding of the film 34'. In step S104, information from the magnetic track MT3 corresponding to the first frame is reproduced by the head gap 51c of the magnetic head 51. In step S105, the contents in step S104 is repeated until the film is wound up by one frame. Then, the feeding motor 25 is, in step S106, stopped. Thus, the operation for reproducing information about the first frame is completed.

The discrimination whether or not the film has been wound up by one frame can be made by detecting the perforations P formed in the film 34' by means of a photoreflector or the like.

In next step S107, information about the first frame stored on the memory 12 of the lens shutter camera 10 is read by the reading circuit 52. Then, information about the date of the photography among the read information items and information reproduced in step S104 are subjected to a comparison in step S108. In step S109, the result of the comparison is discriminated. If the two information items agree with each other, a discrimination is made that the information stored on the memory 12 of the lens shutter camera 10 is the information about the frame of the film in the loaded cartridge. Then the flow proceeds to step S110 shown in FIG. 13 to inversely rotate the feeding motor 25 so that the operation of rewinding the film is commenced.

In step S111, information is reproduced by the head gap 51c of the magnetic head 51 in synchronization with the rewinding operation. The contents in step S111 are repeated until no reproduction output is obtained in step S112. Then, the motor 25 is stopped in step S113. The processes to be performed in steps S111 and S112 are operations to stop the rewinding operation at the position at which the information recording on to the first frame is commenced. Therefore, the reproduced information has no particular meaning. Another arrangement may be employed in which the film is wound up to the position at which recording of information on to the first frame is commenced after the film 34' has been rewound completely.

In step S114, information about one frame of the photography recorded in the memory 12 of the lens shutter camera 10 is read by the reading circuit 52, the thus-read information being then stored on the memory 22. In next step S115, the motor 25 is rotated forwards to commence the film winding operation. In step S116, the information recorded on the memory 22 is, by each of the head gaps 51a to 51c of the magnetic head 51, recorded on the magnetic tracks MT1 to MT3 of the corresponding frames. For example, information about the date of the photography is recorded on the magnetic track MT3, the information about the exposure value is recorded on the magnetic track MT2 and the information about the focal distance is recorded on the magnetic track MT1.

The operation in step S116 is repeated until the film is wound up by one frame in step S117, and then the flow proceeds to step S118. In step S118, a discrimination is made whether or not information has been recorded on all frames of the film 34'. If a negative discrimination is made in step S118, the flow returns to step S113, then the foregoing process is repeated. If an affirmative discrimination is made in step S118, the film 34' is rewound in step S119, and the process is completed here.

If a discrimination is made in step S109 that the information about the date of the photography among the read information items in step S107 and the information reproduced in step S104 do not agree with each other, a discrimination is made that the information stored in the memory 12 of the lens shutter camera 10 is not the information about the frame of the film in the loaded cartridge. Then, the film 34' is rewound in step S120, and an alarm is issued in step S121. The alarm may be performed in such a manner that, for example, an indication of a fact that an inadequate film has been loaded is made on a liquid crystal display unit 27A.

According to the second embodiment of the present invention, the lens shutter camera 10 is connected to the single lens reflex camera 20, the film exposed in the lens shutter camera 10 is loaded in the single lens reflex camera 20, and the single lens reflex camera 20 is set to the recording mode. Then, the film is wound up when the recording start switch SW2 has been switched on. In synchronization with the winding operation, information recorded on the magnetic track MT3 of the first frame is reproduced. Further, information about the date of the photography stored in the memory 22 of the lens shutter camera 10 is read. Then, the foregoing information items are subjected to a comparison. If the two information items agree with each other, a discrimination is made that each information stored in the memory 22 of the lens shutter camera 10 is information about each frame of the film loaded in the camera 20. Thus, information is recorded on the film. That is, information in the memory 22 is read, and the read information is recorded on the magnetic tracks MT1 to MT3 to correspond to each frame in synchronization with the film winding operation.

Figure 14A:
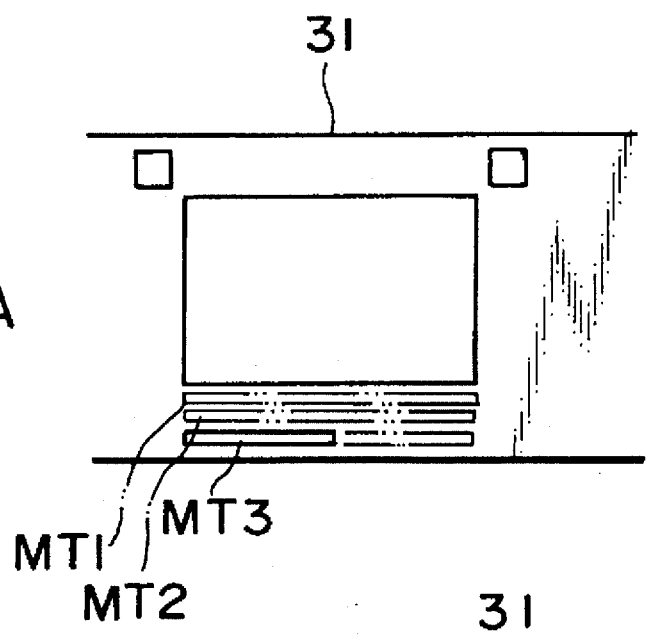
FIGS. 14A and 14B are views which illustrate a state where recording is performed with respect to a magnetic track of the film.
Figure 14B:
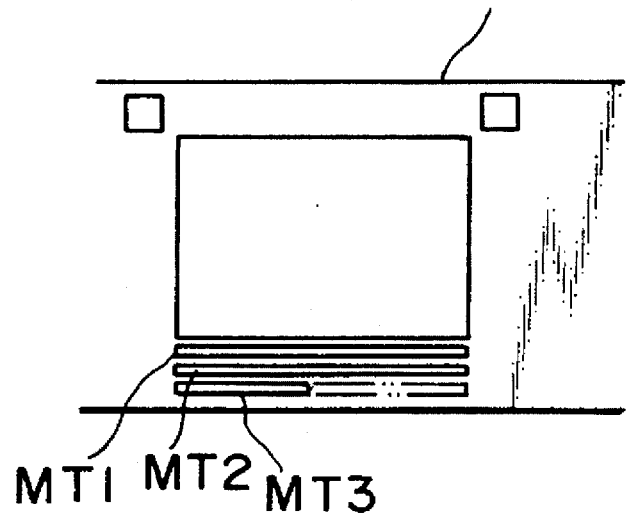

Since information about the photography stored in the lens shutter camera 10 can be, in the single lens reflex camera 20, recorded on the film as described above, a large quantity of information can be recorded on the film 34', even if there is only one head gap in the magnetic head 127 of the lens shutter camera 10. For example, if information is being recorded on only the magnetic track MT3 in the lens shutter camera 10 as shown in FIG. 14A, loading of the film 34' onto the single lens reflex camera 20 enables the information to be recorded on the magnetic tracks MT1 and MT2 as shown in FIG. 14B.

If the information reproduced from the magnetic track MT3 and the information about the date of the photography read from the memory 12 of the lens shutter camera 10 do not agree with each other, a discrimination is made that each information stored in the memory 12 is not information about each frame of the film loaded in the camera 20. Then, the magnetic recording operation is not performed and the film is rewound. Therefore, recording of erroneous information on the film can be prevented.

Although the foregoing embodiment is arranged in such a manner that information for the frames is, one by one, read from the memory of the lens shutter camera 10 and recorded on the film, another arrangement may be employed in which information about all frames is read and stored in the memory before the film is wound up and the information is sequentially recorded as the film is wound up. Although the foregoing embodiment is arranged in such a manner that the information about the first frame reproduced by the magnetic head 51 is compared with the information about the first frame read from the memory 22 to discriminate whether or not the information in the memory 22 is the information about the loaded film, the discrimination method is not limited to the foregoing method. For example, another arrangement may be employed in which film No. recorded in a DX code of the film cartridge is read by the lens shutter camera 10 to be stored on the memory 12, and the foregoing discrimination is made by comparing the film No. read at the time of loading the film in the single lens reflex camera 20 with the film No. read from the memory 12.

Although the foregoing embodiment is arranged in such a manner that information is, in the lens shutter camera 10, recorded on only the magnetic track MT3 and that information is recorded on all of the magnetic tracks MT1 to MT3 in the single lens reflex camera 20, another arrangement may be employed in which information recording on to the magnetic track MT3 is not performed in the single lens reflex camera 20 because information has been recorded on the magnetic track MT3 in the lens shutter camera 10 and the other information items are recorded on only the magnetic tracks MT1 and MT2 in the single lens reflex camera 20. Since the magnetic track MT3 and the magnetic track MT2 are present adjacent to each other, an adverse influence upon the information recorded on the magnetic track MT3 may occur at the time of recording information on the magnetic track MT2. So, another arrangement being made in such a way that information is, in the single lens reflex camera 20, recorded on only the magnetic track MT1 to prevent the adverse influence as described above. Another arrangement may be employed in which information is, in the lens shutter camera 10, recorded on only the magnetic track MT1 or MT2 and information is, in the single lens reflex camera 20, recorded on the residual magnetic tracks. The number of the magnetic tracks is not limited to the three. Two or four or more magnetic tracks may be formed. Although the single lens reflex camera 20 has a plurality of head gaps formed in the magnetic head to enable information to be recorded on the plurality of tracks, a plurality of the magnetic heads may be disposed.

Third Embodiment

Referring to FIGS. 15 to 21, a third embodiment of the present invention will now be described.

This embodiment is arranged in such a manner that a film cartridge has an indication mechanism for indicating the state of use of the film and loading of a cartridge, which has been indicated as a predetermined state of use of the film, in the single lens reflex camera 20 is prevented.

Figure 16:
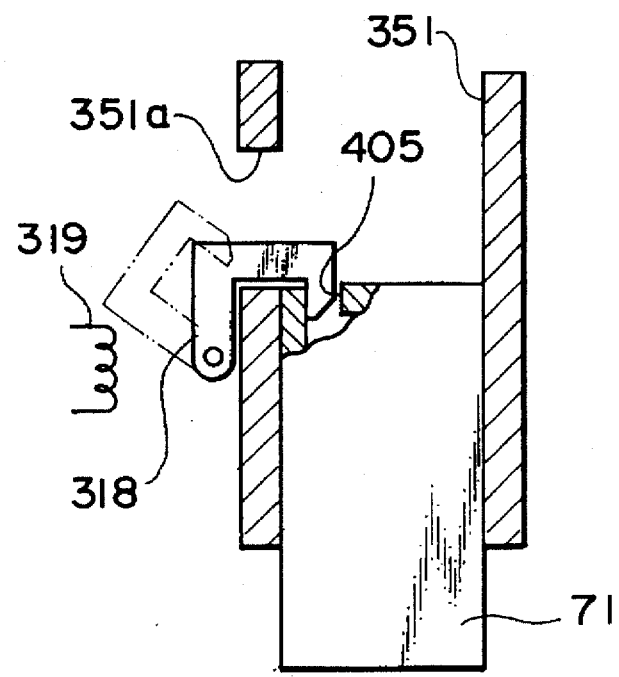
FIG. 16 is a view which illustrates a cartridge loading inhibition mechanism.

A film cartridge 71 according to this embodiment can be loaded into a cartridge chamber 351 in the axial direction through an opening formed in the bottom portion of the camera as shown in FIG. 16. Reference numeral 318 represents a lockout hook for inhibiting/permitting loading of the cartridge 71 into the cartridge chamber 351 in a manner to be described later.

Similarly to the first embodiment, the lens shutter camera 10 according to this embodiment has not the magnetic head for recording, on the magnetic track of the film, photography information, such as date of the photography, the exposed frame No., the exposure value, the shutter speed, and the exposure correction. The lens shutter camera 10 comprises a memory 202 (see FIG. 15) for storing information about the photography for each frame. A variety of control data items for used at the time of controlling the photographing operation are, as well as the information about the photography, stored in the memory 202. The information about the photography stored in the memory 202 is, by the connector CN, transferred to the single lens reflex camera 20, the transferred information about the photography being recorded on the magnetic track 35 (see FIG. 3) of the film 34 by means of a magnetic head 310 in the single lens reflex camera 20.

The lens shutter camera 10 comprises mechanisms required to perform the photographing operation, such as a photometric circuit, a distance measuring circuit, a film feeding motor, a focusing motor and an exposure control unit (omitted from illustration), those units being controlled by a CPU 203. The lens shutter camera 10 may comprises the magnetic head for magnetically recording information similarly to the second embodiment. That is, it might be considered feasible to use the single lens reflex camera 20 in order to magnetically record information in a larger quantity in a case where the camera 10 has a poor ability such that only information, such as date, can be recorded by means of the magnetic head thereof.

Figure 17:
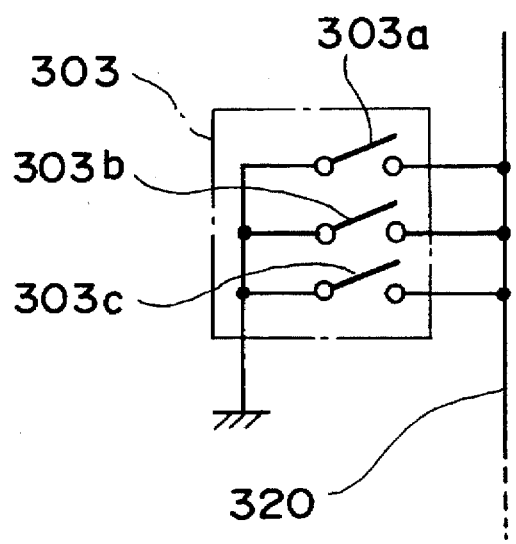
FIG. 17 is a view which illustrates a switch group in detail.

The single lens reflex camera 20 includes a CPU 320. A control switch group 303 comprising a plurality of control switches is connected to the CPU 320. The switches, as shown in FIG. 17, include a recording mode selection switch 303a for setting the recording mode, a data transference start switch 303b for commanding the data transference from the lens shutter camera 10 to the single lens reflex camera 20, and a data recording start switch 303c for commanding data recording on the film 34. Further, the control switch group 303 includes known switches, such as a half-depression switch, a release switch and an intermediate rewinding switch.

Further, the following units are connected to the CPU 320: a communicating I/F 302 for establishing the communication with the lens shutter camera 10; a memory 304 for storing a variety of data items for use to control the photographing operation and information about the photography obtained from the lens shutter camera 10; a fork encoder 305 and a buzzer driver 307 for operating an alarm buzzer 306.

In addition, the following units are connected to the CPU 320: a cartridge detection switch 308 for detecting loading of the cartridge 71; a perforation detection photointerrupter 309 for detecting perforations (omitted from illustration) formed in the film; a head I/F 311 for operating the magnetic head 310; and a shutter I/F 313 for operating a shutter 312. In addition, the following units are connected to the CPU 320: a motor driver 315 for rotating a film feeding motor 314; an LCD driver 317 for driving an LCD 316; and a lockout hook driver 319 for driving a lockout hook 318. The LCD 316 displays a variety of information items and alarms.

The film cartridge 71 has, on the top surface thereof, a disc formed integrally with a spool shaft and rotated in synchronization with feeding of the film. The disc has a cut portion 405 (see FIG. 18A) in a portion thereof. The position of the cut portion 405 indicates the state of use of the film and the cut portion 405, together with the lockout hook 318, forms a mechanism for inhibiting loading of the cartridge. FIG. 18A illustrates a state where an unused film, all frames of which have not been exposed, is indicated. When the cartridge is shipped, the cut portions 405 of all cartridges are positioned at the foregoing position in the FIG. 18A. FIG. 18B illustrates a state where an indication of an partially used film, a portion of the frames of which has been exposed is made. FIG. 18C illustrates a state where an indication of a completely used film all frames of which have been exposed is made.

Figure 18:
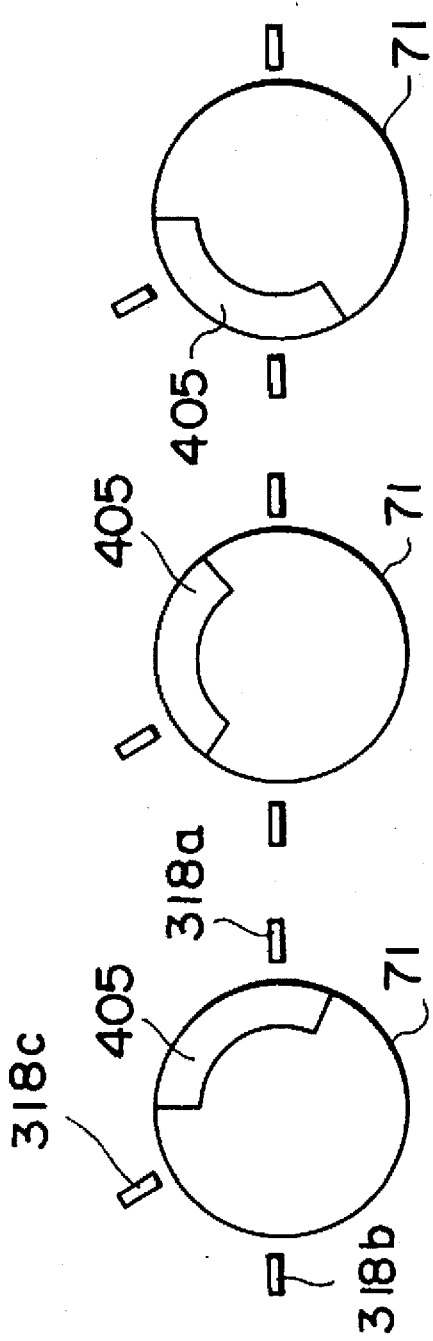
FIGS. 18A to 18C are views which illustrate the arrangement of the loading inhibition mechanism and the positions of cut portion corresponding to the state of use of the film.
Figure 19:
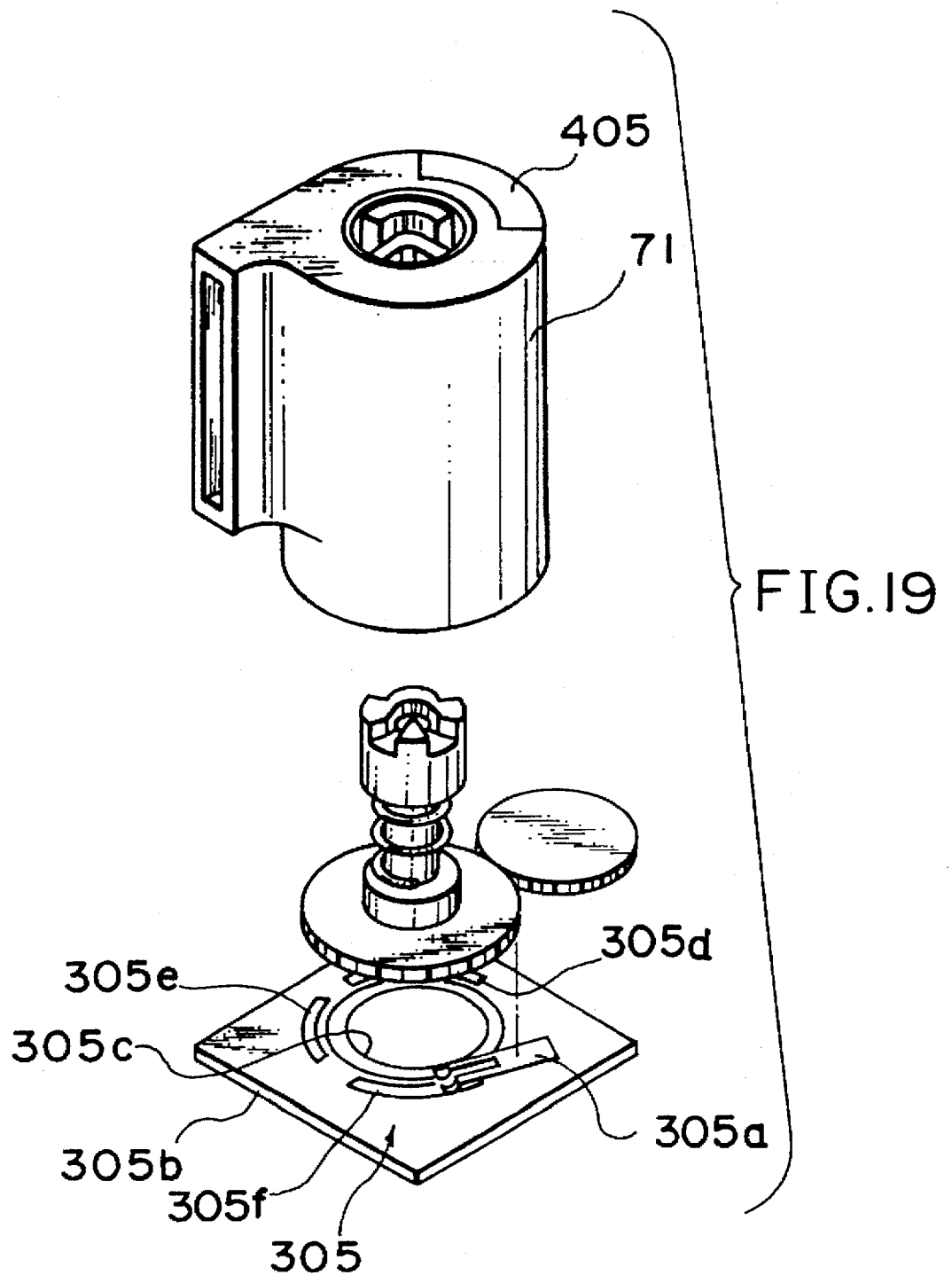
FIG. 19 is a view which illustrates the structure of the fork encoder of the single lens reflex camera.

The single lens reflex camera 20 acts in accordance with an output from the fork encoder 305 shown in FIG. 19 to enable an adequate state of use of the film to be obtained by controlling the position of the foregoing cut portion 405. In this embodiment, when the cut portion 405 is located at either of the positions shown in FIGS. 18A, 18B, 18C, a brush 305a contacts with the segment patterns 305d, 305e, 305f of the fork encoder 305 respectively.

Although FIG. 16 illustrates one lockout hook 318, three lockout hooks 318 are disposed on the outside of the cartridge 351 as designated by reference numerals 318a to 318c as shown in FIG. 18. When no electric power is supplied to the lockout hook driver 319, the lockout hook 318 is allowed to project into the cartridge chamber 351 through a hole 351a as designated by a continuous line of FIG. 16. When electric power is supplied to the lockout hook driver 319, the lockout hook 318 is, as designated by an alternate long and two short dashes line, retracted from the cartridge chamber 351 through the hole 351a. Also three lockout hook drivers 319 are disposed to correspond to the hooks 318a to 318c to independently drive the hooks 318a to 318c.

An example consideration is made here that only the lockout hook 318a is allowed to project into the cartridge chamber 351 and the residual lockout hooks 318b and 318c are retracted. When an unused cartridge indicated as the unused film shown in FIG. 18A is intended to be loaded, the leading end of the lockout hook 318a is, as shown in FIG. 16, engaged to the cut portion 405, causing the further introduction of the cartridge to be prevented. That is, loading of the unused cartridge is inhibited. In a case where each cartridge shown in FIGS. 18B or 18C is intended to be loaded in a state where only the hook 318a is allowed to project similarly to the foregoing case, the hook 318a is not engaged to the cut portion 405 but the same is rotated from the top surface of the cartridge to the position designated by an alternate long and two short dashes line as illustrated. As a result, loading of the cartridge is permitted. If the hook 318a is retracted from the cartridge chamber 351 and the residual hooks 318b and 318c are allowed to project into the cartridge chamber 351, only loading of the unused cartridge is permitted on the contrary.

Then, the operation of this embodiment will now be described.

In the lens shutter camera 10, whenever the release button is depressed, the photographing operation is performed and information about photography about the exposed frame is stored in the memory 202.

Figure 20:
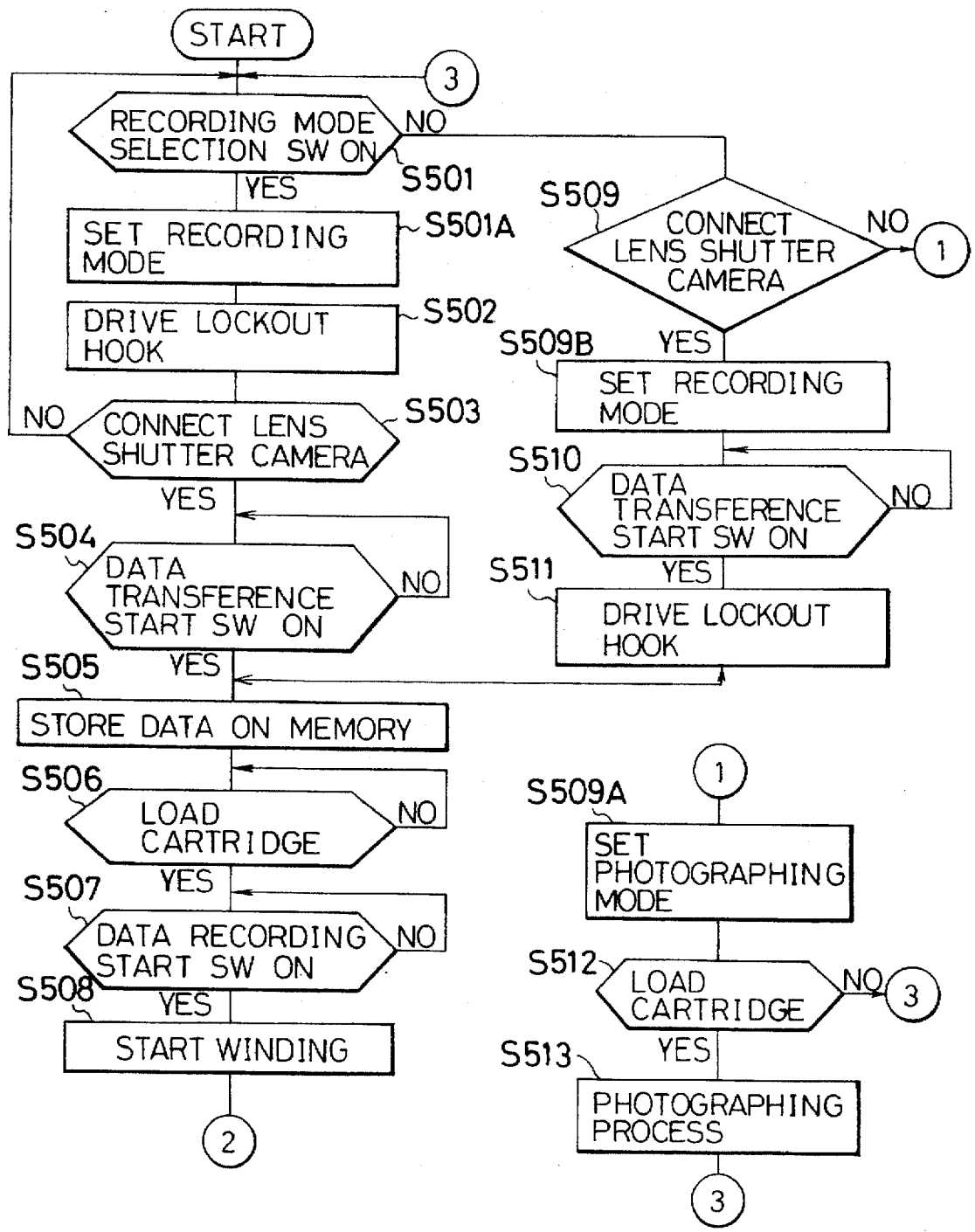
FIGS. 20 and 21 are views which illustrate a flow chart of the operation of the third embodiment.
Figure 21:
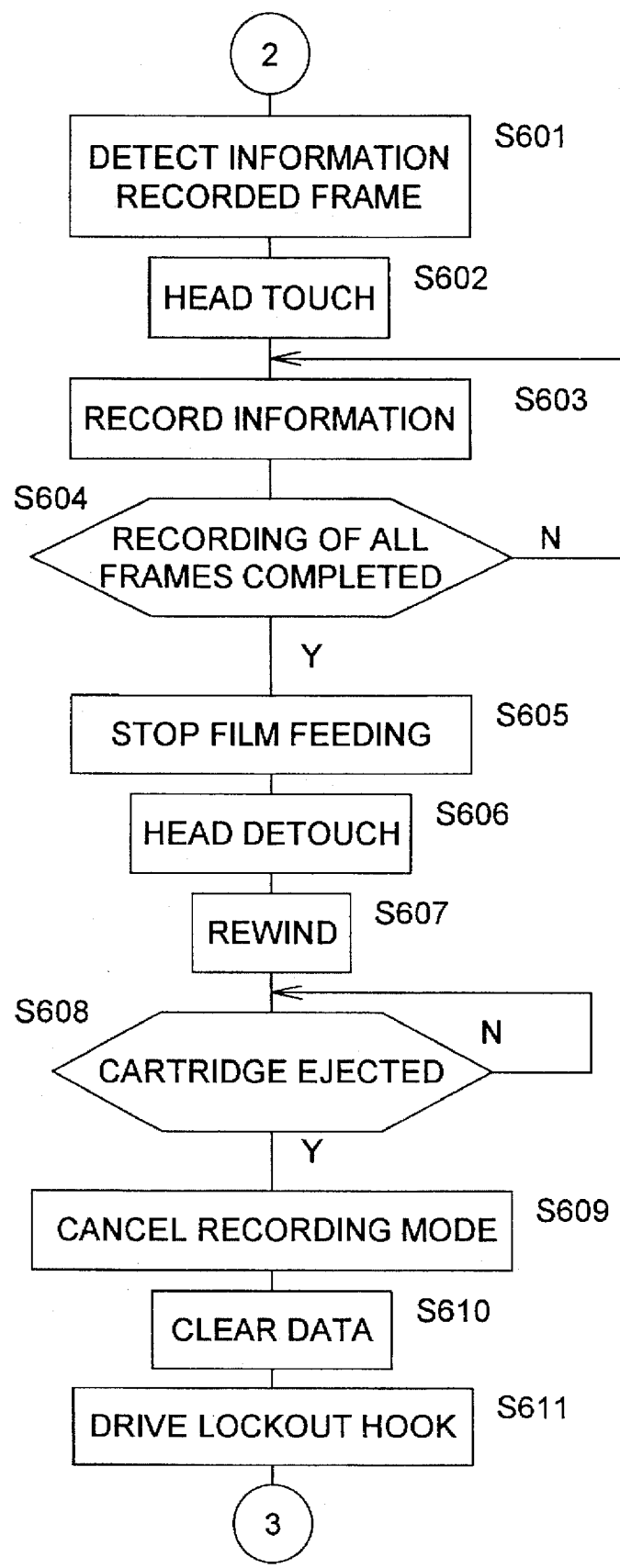

FIGS. 20 and 21 illustrate a flow chart showing the procedure of control to be performed by the CPU 320 of the single lens reflex camera 20.

If power is supplied when the film cartridge 71 has not been loaded, this program is commenced. In step S501, a discrimination is made whether or not the recording mode selection switch 303a is being switched on. If the recording mode selection switch 303a is being switched on, the recording mode is selected and set in step S501A and the flow proceeds to step S502 in which only the lockout hook 318a is allowed to project into the cartridge chamber 351 and the residual hooks 318b and 318c are retracted. As a result, loading of the unused cartridge is inhibited and any one of loading of the partially used and completely used cartridges is permitted. In step S503, a discrimination is made whether or not the lens shutter camera 10 has been connected to single lens reflex camera 20. If a negative discrimination is made, the flow returns to step S501. If an affirmative discrimination is made, the flow proceeds to step S504.

In step S504, a moment the data transference start switch 303b is switched on is waited for. If it is switched on, the flow proceeds to step S505. When the data transference start switch 303b is switched on, information about photography for each frame is transferred from the memory 202 of the lens shutter camera 10 to the CPU 320 of the single lens reflex camera 20. In the single lens reflex camera 20, the thus-transferred information is stored in the memory 304 in step S505. In step S506, a discrimination is made whether or not the cartridge has been loaded in accordance with whether or not the cartridge detection switch 308 has been switched on. If the cartridge has not been loaded, loading of the cartridge is waited for. If the cartridge is loaded, the flow proceeds to step S507. In step S507, actuating of the data recording start switch 303c is waited for. If the switch 303c is switched on, the feeding motor 314 is rotated in step S508 to commence winding of the film. Then, the flow proceeds to step S601 shown in FIG. 21.

If a discrimination is made in step S501 that the recording mode selection switch 303a has been switched off, a discrimination is made in step S509 whether or not the lens shutter camera 10 has been connected to the single lens reflex camera 20. If the lens shutter camera 10 has not been connected, the photographing mode is set in step S509A, and the flow proceeds to step S512. In step S512, whether or not the cartridge has been loaded is discriminated. If no cartridge has not been loaded, the flow returns to step S501. If a cartridge has been loaded, the flow proceeds to step S513. Since a state where loading of only an unused cartridge is permitted is, as a manner to be described later, automatically realized after recording of one film has been completed in the recording mode, the cartridge loaded at this time is an unused cartridge without exception. In step S513, the ordinary photographing process is performed. Although the detailed description of the photographing process is omitted here, it is performed as follows.

First, initial feeding of the film is performed to cause the first frame to face the aperture. Then, the exposure operation is performed whenever the release switch is switched on. Further, the film is wound up by one frame, and in synchronization with the winding operation, information about photography is recorded on the magnetic track of the film. After all frames have been exposed or the intermediate rewinding switch has been switched on, the film is rewound. After the film has been rewound, the state of use of the film is indicated. That is, rotations of the spool shaft of the cartridge in the rewinding direction is continued after the film has been rewound. If the film has been rewound after all frames had been exposed to light, the rotations of the feeding motor are stopped when it is detected that the brush 305a of the fork encoder 305 (see FIG. 19) contacts with the segment pattern 305f. As a result, the cut portion 405 of the cartridge is brought to a state shown in FIG. 18C, so, the cut portion 405 indicates the completely used film. If the film has been rewound when the intermediate rewinding switch has been switched on, the rotations of the feeding motor are stopped when it is detected that the brush 305a contacts with the segment pattern 305e. As a result, the cut portion 405 of the cartridge is brought into a state shown in FIG. 18B, so, the cut portion 405 indicates the partially used film. Then, the flow returns to step S501 if the cartridge is ejected.

If a discrimination is made in step S509 that the lens shutter camera 10 has been connected, the recording mode is set in step S509B, and the flow proceeds to step S510. In step S510, a moment the data transference start switch 303b is switched on is waited for. If the switch 303b is switched on, the flow proceeds to step S511. In step S511, a process similar to step S502 is performed to inhibit loading of the unused cartridge and permit loading of the partially used cartridge and the completely used cartridge. Then, the processes in step S505 to S508 are performed, and then the flow proceeds to step S601 shown in FIG. 21.

As described above, the recording mode is, in this embodiment, basically set when the recording mode selection switch 303a is switched on. However, if a discrimination of the connection of the lens shutter camera 10 to the single lens reflex camera 20 by means of the connector CN is detected, the recording mode is automatically set even if the recording mode selection switch 303a is switched off.

In step S601, the film is fed to position the leading frame (the first frame in usual), on which information must be recorded, to a position at which the information can be recorded on the frame. If the subject frame has been brought to the position at which information can be recorded, the magnetic recording head 310 is driven by the head I/F 311 in step S602 to bring the magnetic head 310 to be contact with the film 34. In next step S603, the head I/F 311 causes the magnetic head 310 to be driven so that information stored in the memory 304, that is, information about photography supplied from the lens shutter camera 10 is recorded on the magnetic track 35 of the film 34.

In step S604, a discrimination is made whether or not information has been magnetically recorded on all frames, on which information must be recorded. If a negative discrimination is made, the flow returns to step S603. If an affirmative discrimination is made, the rotations of the film feeding motor 314 are stopped in step S605. As a result of the controls performed in steps S601 to S605, the information about photography of each frame stored in the memory 202 can be recorded on the corresponding recording region of each frame of film photographed in the lens shutter camera 10.

In next step S606, the head I/F 311 causes the magnetic head 310 to be retracted from the film. In step S607, the film feeding motor 314 is rotated to commence rewinding of the film 34. The rewinding operation may be automatically performed after the recording operation has been completed or it may be performed when a rewinding switch (omitted from illustration) has been operated.

In step S608, ejecting of the cartridge 71 is waited for. After the cartridge 71 has been ejected, the recording mode is canceled, the photographing mode is set and the recording mode selection switch 303a is switched off in step S609. In step S610, the information about photography stored on the memory 304 is cleared. That is, this embodiment is arranged in such a manner that the photographing mode is automatically set after magnetic information recording on one film 34 has been completed. The information clearing operation to be performed in step S610 can be omitted. Another arrangement may be employed in which the information clearing operation is performed when the cartridge 71 is then loaded or when an unused cartridge is then loaded or when the recording mode is selected.

In step S611, the lockout hooks 318b and 318c are allowed to project into the cartridge chamber 351 and the lockout hook 318a is retracted. As a result, loading of the unused cartridge is permitted and any one of loading of the partially used and completely used cartridges is inhibited. Then, the flow returns to step S501 shown in FIG. 20.

According to the procedure shown in FIGS. 20 and 21, the ordinary photographing operation is permitted when the photographing mode has been selected. In this state, the lockout hooks 318b and 318c are allowed to project into the cartridge chamber 351 and the hook 318a is retracted. As a result, loading of only the unused cartridge is permitted and any one of loading of the completely used and partially used cartridges is inhibited. Therefore, erroneous double exposure of the completely used film and the partially used film can be prevented.

If the recording mode is selected, the photographing operation is not performed but information is recorded on the film. That is, information stored in the memory of another camera is supplied, and the supplied information is recorded on the film. As a result, loading of a film exposed in a camera, such as the lens shutter camera 10, having no magnetic head into the single lens reflex camera 20 enables the information about photography to be recorded on each frame of the film.

When the recording mode is set, the lockout hooks 318b and 318c are retracted from the cartridge chamber 351 and the hook 318a is allowed to project. Thus, loading of the unused cartridge is inhibited and any one of loading of the completely used and partially used cartridges is permitted. Accordingly, information recording on the completely used film and the partially used film is permitted and erroneous recording of the information about photography on the unused film can be prevented.

Figure 22:
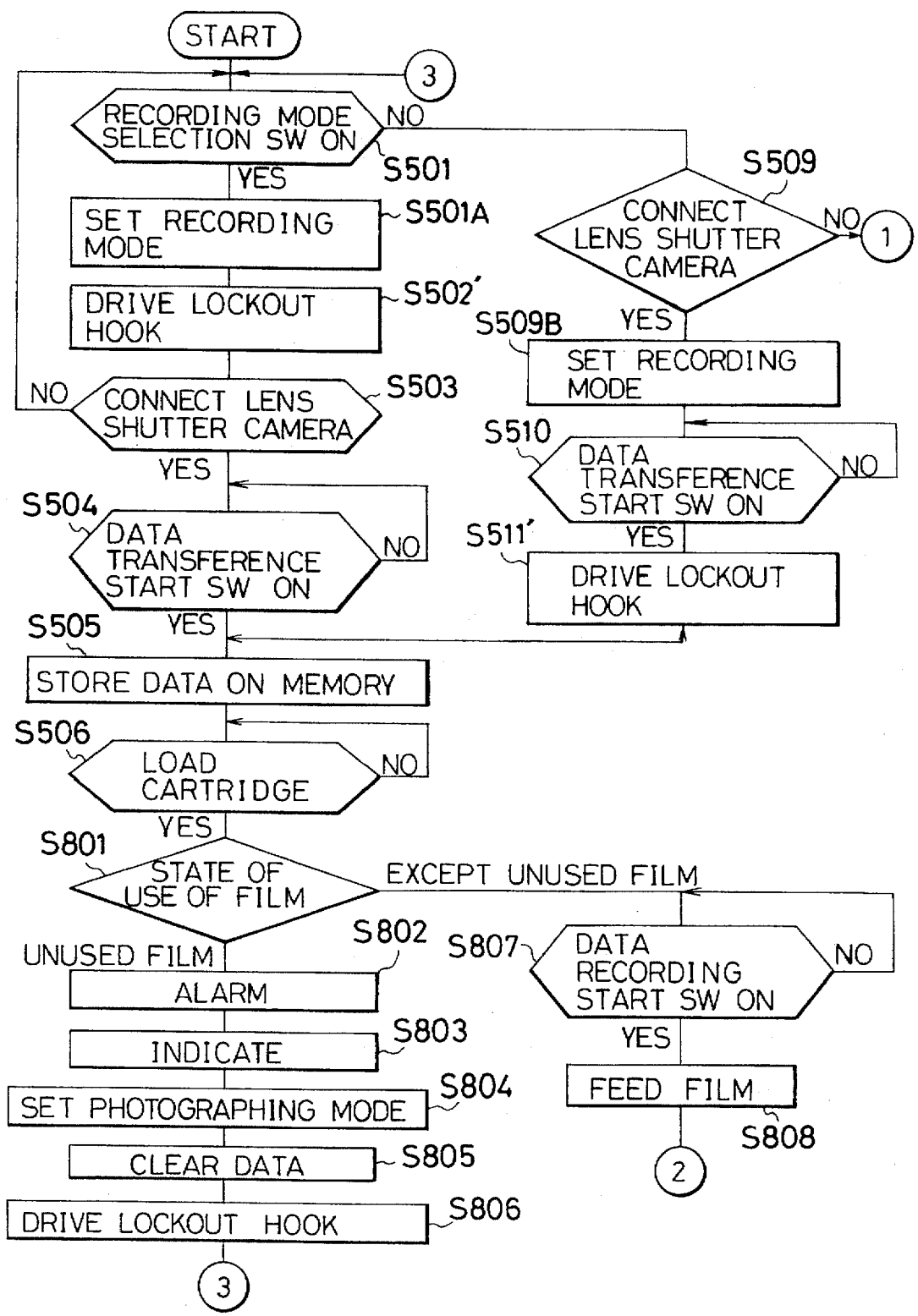
FIG. 22 is a flow chart which illustrates another embodiment to correspond to FIG. 20.

FIG. 22 illustrates another embodiment.

The embodiment shown in FIG. 22 is arranged in such a manner that loading of only the unused cartridge into the single lens reflex camera 20 is permitted similarly to the foregoing embodiment if the photographing mode is being set. And if the recording mode is being set, all of loading of the unused, completely used and partially used cartridges are permitted. However, switching to the photographing mode is automatically performed if an unused cartridge is loaded in a state where the recording mode has been selected.

FIG. 22 is a flow chart corresponding to that shown in FIG. 20. Referring to FIG. 22, similar steps to those shown in FIG. 20 are given the same step Nos. and the description will be made about the different portions.

In steps S502' and S511', all of the lockout hooks 318a to 318c are retracted from the cartridge chamber 351. As a result, loading of all of the cartridges, that is, the unused cartridge, the partially used cartridge and the completely used cartridge are permitted to be loaded.

In step S801, discrimination of the state of use of the cartridge 71 is performed using the output from the fork encoder 305. If a loaded cartridge is an unused cartridge, the flow proceeds to step S802 in which the fact that the unused cartridge has been loaded in the recording mode is alarmed with the buzzer 306. In step S803, the contents of the alarm are disposed on the LCD 316. In step S804, the recording mode is canceled and the photographing mode is set. Further, switching to the photographing mode is displayed on the LCD 316 to inform the photographer. In step S805, the information about photography transferred from the lens shutter camera 10 and stored in the memory 304 of the single lens reflex camera 20 is cleared. In step S806, the lockout hooks 318a and 318b are allowed to project into the cartridge chamber 351 and the lockout hook 318c is retracted. As a result, loading of only an unused cartridge is permitted and loading of a complete or partially used cartridge is inhibited. Then, the flow returns to step S501.

If a discrimination has been made in step S801 that the loaded cartridge is an incomplete or completely used cartridge, a moment the data recording start switch 303c is switched on is waited for in step S807. If switch 303c is switched on, the flow proceeds to step S808 in which film feeding is commenced. Then, the flow proceeds to step S601 shown in FIG. 21.

As described above, the recording mode is canceled and the photographing mode is set if an unused cartridge is loaded when the recording mode has been set. Even if an unused cartridge is loaded by photographer who does not know the fact that the recording mode has been set, erroneous recording of information on the unused film can be prevented. Further, the film can be used to commence the photographing operation without any operation. Therefore, the handling facility can be improved.

Fourth Embodiment

Referring to FIGS. 23A to 27, a fourth embodiment of the present invention will now be described.

The single lens reflex camera 20 according to this embodiment has, as the recording mode, the following modes: an external input mode for recording information supplied from the other camera on the magnetic track of the film; and an inner processing mode for changing information recorded on the film.

FIGS. 23A to 23C illustrate the cut portion 405 of the cartridge 71 is, similarly to the structures shown in FIGS. 18A to 18C, switched to the state where an indication of an unused film is made, the state where an indication of an partially used film is made, and the state where an indication of a completely used film is made. In contrasted with FIGS. 23A to 23C which illustrate the indication of the film in the non-developed state, FIG. 23D illustrates an indication of a developed film. The developed film has been again accommodated in the cartridge after it had been brought to a laboratory by a user to be developed. The cut portion 405 of the cartridge which accommodates the developed film is, in the laboratory, controlled to be brought to the position shown in FIG. 23D.

Figure 24A:
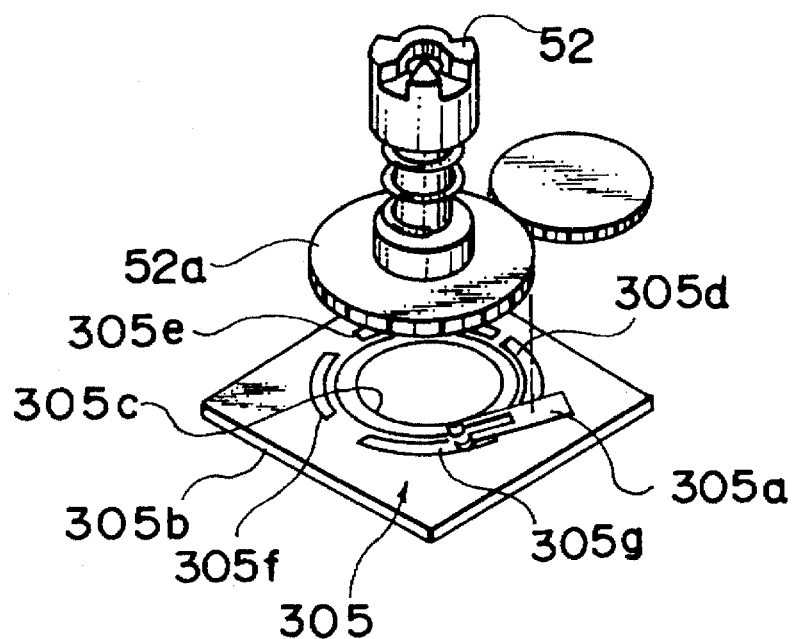
FIG. 24A is a view which illustrates the structure of the fork encoder of the single lens reflex camera.

Since the indication of the developed film is added as described above, a fork encoder according to this embodiment has four segment patterns 305d to 305g as shown in FIG. 24A. When the cut portion 405 are brought to the positions shown in FIGS. 23A, 23B, 23C, 23D, the brush 24a contacts with the segment patterns 305d, 305e, 305f, 305g respectively. In this embodiment, four lockout hooks 318 and the lockout hook drivers 319 are disposed to correspond to the states shown in FIGS. 23A to 23D so that each lockout hook 318 (318a to 318d) is independently driven by the driver 319.

Figure 15:
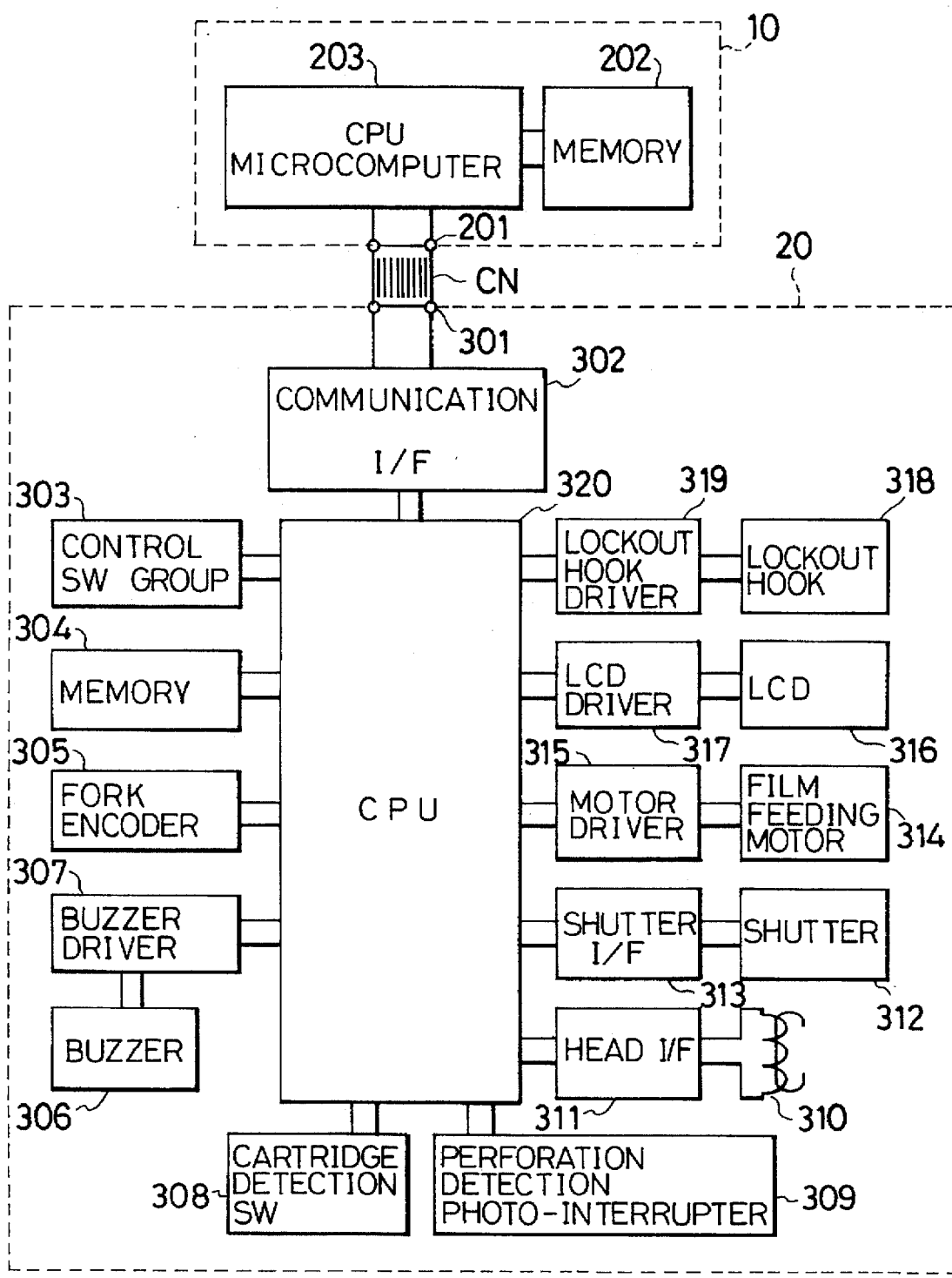
FIG. 15 is a block diagram which illustrates the control system of the single lens reflex camera and the lens shutter camera according to a third embodiment.
Figure 24B:
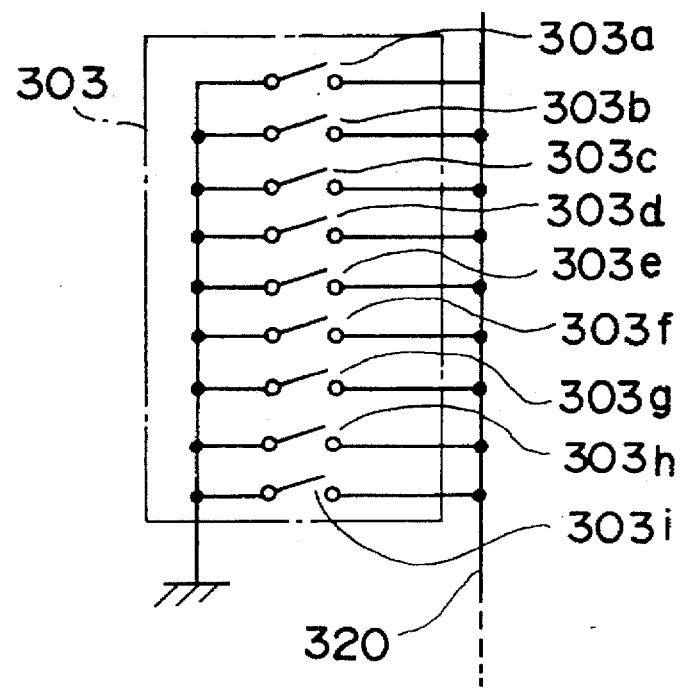
FIG. 24B is a view which illustrates the switch group.

Although the structure of the control system according to this embodiment is made similar to that according to the third embodiment shown in FIG. 15, switches are added to the control switch group 303 as shown in FIG. 24B. The added switches are: external input mode selection switch 303d; a reproduction start switch 303e that acts as a frame instructing member to assist in frame advancement as required; a data change selection switch 303f; a change canceling switch 303g; a data correction switch 303h; and a re-recording start switch 303i.

The external input mode selection switch 303d is a switch for selecting the external input mode or the internal processing mode when the recording mode is set. When the external input mode selection switch 303d is switched on, the external input mode is set. When the same is switched off, the internal processing mode is set. The reproduction start switch 303e is a switch for commanding to reproduce information recorded on the magnetic track 35 of the film 34. The data change selection switch 303f is a switch to be operated when data is changed in a case where the internal processing mode is selected. The change canceling switch 303g is a switch to be operated when the data change is canceled in a state where the internal processing mode is selected. The data correction switch 303h is a switch to be operated when information recorded on the magnetic tack 35 is actually modified. The re-recording start switch 303i is a switch with which a command is made to perform a re-recording operation after the operation of magnetically recording information on the film has been completed.

The operation of this embodiment will now be described.

Whenever the release button of the lens shutter camera 10 is operated, the photographing operation is performed, and the information about photography about the exposed frame is stored in the memory 202.

Figure 25:
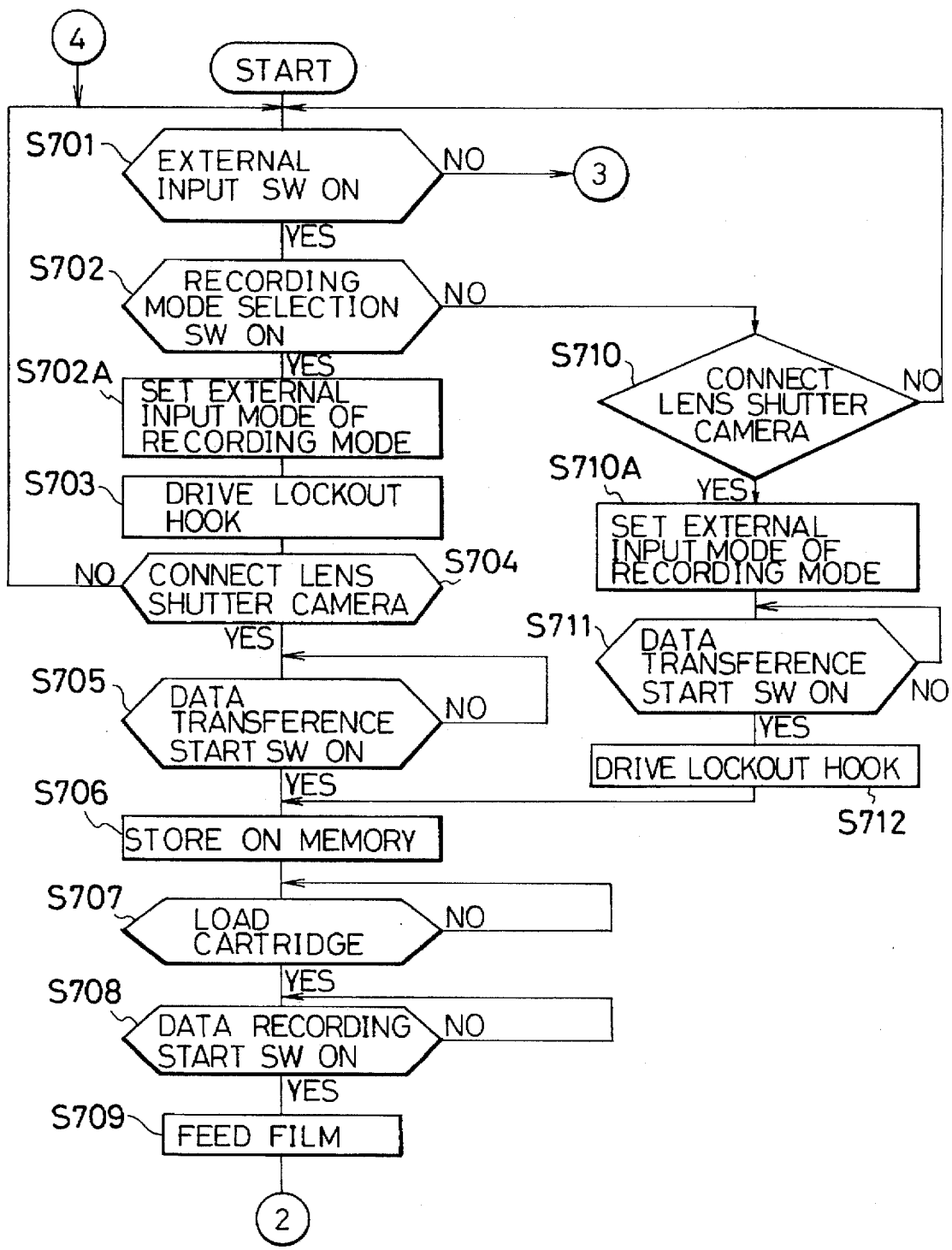
FIGS. 25 to 27 illustrate a flow chart of the operation of a fourth embodiment.
Figure 26:
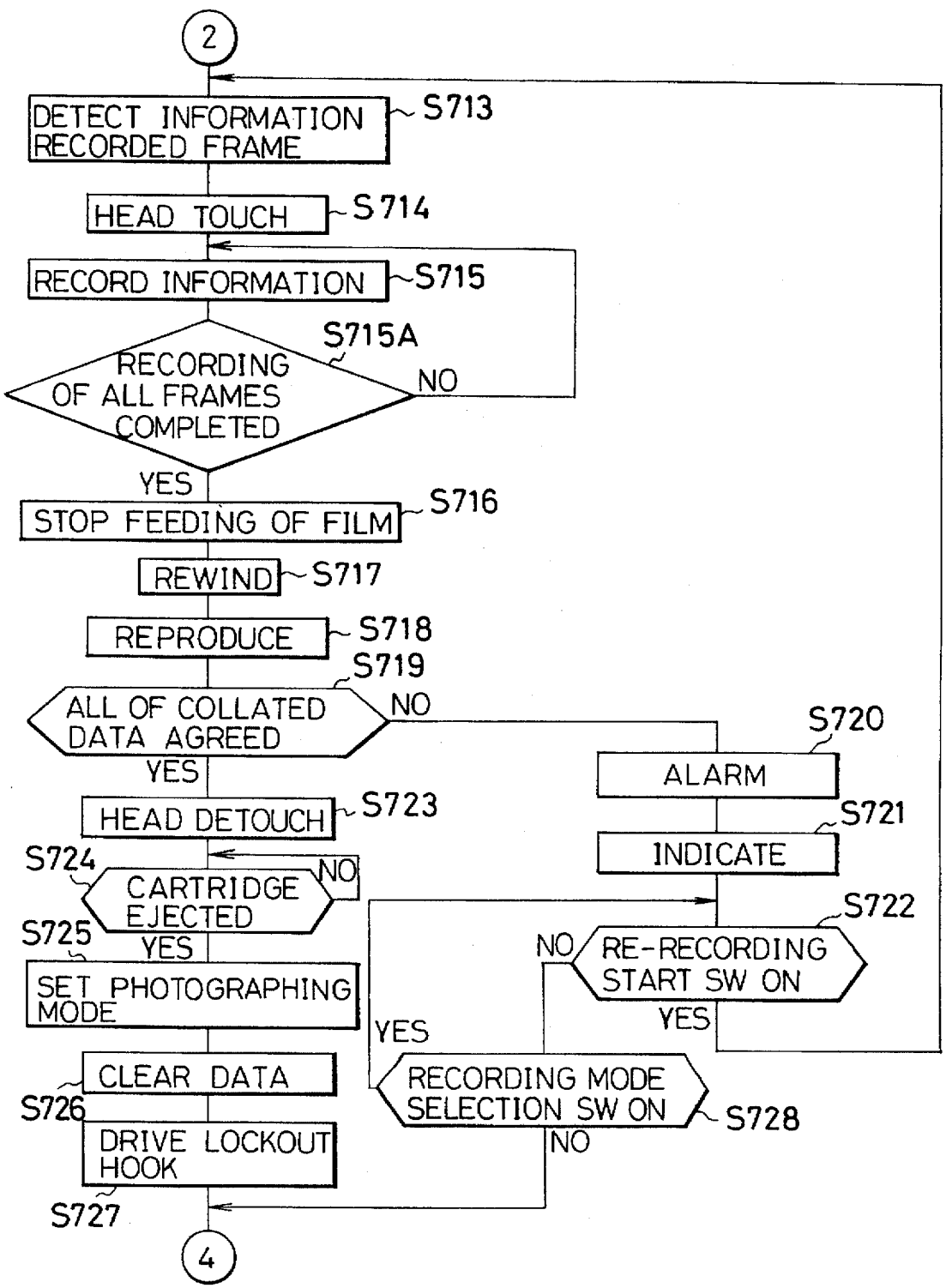
Figure 27:
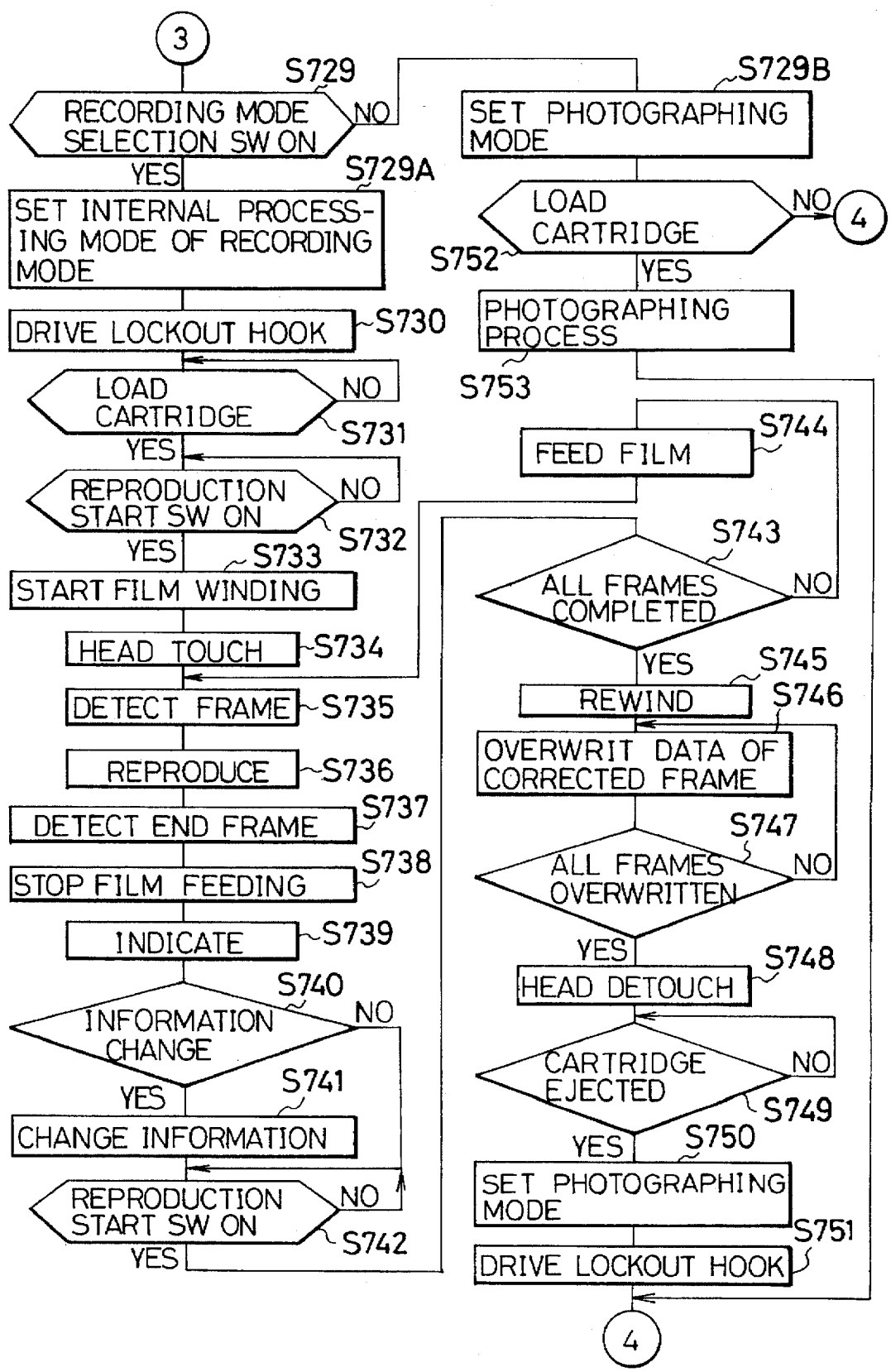

FIGS. 25 to 27 illustrate a flow chart which illustrates the procedure of the control to be performed by the CPU 320 of the single lens reflex camera 20.

When electric power is supplied in a state where cartridge 71 is not loaded, this program is started. In step S701 shown in FIG. 25, a discrimination is made whether or not the external input mode selection switch 303d has been switched. If the switch 303d has been switched on, the flow proceeds to step S702 in which a discrimination is made whether or not the mode selection switch 303a has been switched on.

If the mode selection switch 303a has been switched on, the internal processing mode is selected and set in step S702A, and then the flow proceeds to step S703 in which only the lockout hook 318a is allowed to project into the cartridge chamber 351 and the residual hooks 318b to 318d are retracted. As a result, loading of the unused cartridge is inhibited and loading of the partially used cartridge, the completely used cartridge and the developed cartridge is permitted. In step S704, a discrimination is made whether or not the lens shutter camera 10 has been connected to the single lens reflex camera 20. If a negative discrimination is made, the flow returns to step S701. If an affirmative discrimination is made, the flow proceeds to step S705.

In step S705, a moment the data transference start switch 303b is switched on is waited for. If the switch 303b is switched on, the flow proceeds to step S706. When the data transference start switch 303b is switched on, the information about photography for each frame of the film is transferred from the memory 202 of the lens shutter camera 10 to the CPU 320 of the single lens reflex camera 20. In the single lens reflex camera 20, the thus-transferred information is stored on the memory 304 in step S706. In step S707, loading of the cartridge is waited for. When the cartridge has been loaded, the flow proceeds to step S708, in which a moment the data recording start switch 303c is switched on is waited for. When the switch 303c is switched on, winding of the film is commenced by rotating the feeding motor 314 in next step S709. Then, the flow proceeds to step S713 shown in FIG. 26.

If a discrimination is made that the recording mode selection switch 303a is switched off in step S702, a discrimination is made in step S710 whether or not the lens shutter camera 10 has been connected to the single lens reflex camera 20. If the lens shutter camera 10 has not been connected, the flow returns to step S701. If the lens shutter camera 10 has been connected, the external input mode in the recording mode is set in step S710A. Then, the flow proceeds to step S711, in which a moment the data transfer start switch 303b is switched off is waited for. If the switch 303b has been switched on, the flow proceeds to step S712. In step S712, an operation similar to that to be performed in step S703 is performed so that loading of the unused cartridge is inhibited and loading of partially used cartridge, completely used cartridge and the developed cartridge is permitted. Then, the foregoing operations in steps S706 to S709 are performed, and the flow proceeds to step S713 shown in FIG. 26.

In step S713, the film is fed to bring one of frames, on which information must be recorded, to a position at which the recording operation is performed. In step S714, the magnetic recording head 310 is brought into contact with the magnetic track by the head I/F 311. In next step S715, the magnetic head 310 is operated by the head I/F 311 to record, on the magnetic track of the film, information stored on the memory 304, that is, the information about photography supplied from the lens shutter camera 10.

In step S715A, a discrimination is made whether or not information has been recorded on all frames, on which information must be recorded. If a negative discrimination is made, the flow returns to step S713. If an affirmative discrimination is made, the rotation of the film feeding motor 314 is stopped in step S716. As a result of the foregoing control, the information about photography stored in the memory 202 can be recorded on the film exposed in the lens shutter camera 10 to correspond to each frame.

In next step S717, the film feeding motor 314 is rotated to commence rewinding of the film. In step S718, the magnetic head 310 is operated by the head I/F 311 so that information about each frame recorded on the film is reproduced. In step S719, a discrimination is made whether or not, information of each frame reproduced in step S718 agrees with information of each frame stored in the memory 304. If a negative discrimination is made, the flow proceeds to step S720. In step S720, a buzzer driver 307 is actuated to operate the buzzer 306 to notify a fact that an error has took place in information recording. Further, the No. of the error frame of which information do not agree with each other is displayed on the LCD 316 in step S721. In step S722, a discrimination is made whether or not the re-recording start switch 303i has been switched on. If the switch 303i has been switched off, a discrimination is, in step S728, made whether or not the recording mode selection switch 303a has been switched on. If the recording mode selection switch 303a has been switched off, the flow returns to step S701 shown in FIG. 25. If the switch 303a has been switched on, the flow returns to step S722. If a discrimination is made in step S722 that the re-recording start switch 303i has been switched on, the flow returns to step S713 and the foregoing process is repeated.

If a discrimination is made in step S719 that the reproduced information and the stored information completely agree with each other, the flow proceeds to step S723 in which the magnetic head 310 is retracted from the film by the head I/F 311. In step S724, ejection of the cartridge is waited for. If the cartridge is ejected, the recording mode is canceled and the photographing mode is set in step S725. Then, both of the recording mode selection switch 303a and the external input mode selection switch 303d are switched off. That is, this embodiment is arranged in such a manner that, when information has been magnetically recorded on one film, the photographing mode is automatically set. The information about photography stored in the memory 304 is cleared in step S726.

In step S727, the lockout hooks 318b to 318d are allowed to project into the cartridge chamber 351 and the lockout hook 318a is retracted. As a result, loading of only the unused cartridge is permitted and loading of the completely used cartridge, partially used cartridge and the developed cartridge is inhibited. Then, the flow returns to step S701 shown in FIG. 25.

If a discrimination is made in step S701 shown in FIG. 25 that the external input mode selection switch 303d has been switched off, the flow proceeds to step S729 shown in FIG. 27. If a discrimination has been made in step S729 that the recording mode selection switch 303a has been switched on, the internal processing mode in the recording mode is set in step S729A. Then, the flow proceeds to step S730. In step S730, the lockout hooks 318b to 318d are retracted from the cartridge chamber 351 and only the lockout hook 318a is allowed to project into the cartridge chamber 351. As a result, loading of the unused cartridge is inhibited and loading of the completely used cartridge, the partially used cartridge and the developed cartridge is permitted. In step S731, loading of the cartridge is waited for. When the cartridge is loaded, the flow proceeds to step S732.

In step S732, a moment the reproduction start switch 303e is switched on is waited for. If the reproduction start switch 303e is switched on, winding of the film is commenced in step S733. In step S734, the magnetic head 310 is brought into contact with the film. In step S735, a moment the frame, from which information must be reproduced, is brought to a position, at which the reproduction can be performed, is waited for. In step S736, the information about photography, which has been magnetically recorded, is reproduced by the magnetic head 310. In step S737, the end of the subject frame is detected by the perforation detection photo-interrupter 309. In step S738, feeding of the film is stopped, and the thus-reproduced information of the subject frame is displayed on the LCD 316.

In step S740, a discrimination is made whether or not change (correction, addition and deletion) of the displayed information has been commanded. This discrimination is made depending upon whether or not the data change selection switch 303f or the change canceling switch 303g has been switched on. If the data change selection switch 303f has been switched on, a discrimination is made that the information about photography is changed and the flow proceeds to step S741. If the change canceling switch 303g has been switched on, a discrimination is made that no change is performed and the flow proceeds to step S742. In step S741, data of the displayed information is changed (corrected, deleted or added) in response to the operation of the data correction switch 303h, and the thus-changed information is again stored in the memory 304. In step S742, determination is made whether the reproduction start switch 303e is switched on to assist in frame advancement as required. If the switch 303e is switched on, a discrimination is made in step S743 whether or not the process in step S735 to S742 has been performed on all frames. If a negative discrimination has been made, the flow proceeds to step S744. In step S744, winding of the film is commenced, and the flow returns to step S735. Then, the process in step S735 to S742 is repeated.

As a result of the process performed in steps S733 to S744, the contents of information stored on the film can be changed and changed information can be stored in the memory 304. However, the changed information is not recorded on the film at this time. The information recording process is, as described later, performed collectively at the time of performing the rewinding operation of the film.

If an affirmative discrimination is made in step S743, the flow proceeds to step S745 in which rewinding of the film is commenced. In synchronization with the rewinding operation, information about the frame subjected to the information change process is rewritten by overwriting in step S746. In step S747, a discrimination is made whether or not information of all frames subjected to the information change has been rewritten. If a negative discrimination is made, the flow returns to step S746. If an affirmative discrimination is made, the flow proceeds to step S748. In step S748, the magnetic recording head 310 is retracted from the film by means of the head I/F 311.

In next step S749, ejection of the cartridge is waited for, and the flow proceeds to step S750 in which the recording mode is canceled and the photographing mode is set. Then, the recording mode selection switch 303a and the external input mode selection switch 303d are switched off. In step S751, the lockout hooks 318b to 318d are allowed to project into the cartridge chamber 351 and the lockout hook 318a is retracted. As a result, loading of only the unused cartridge is permitted and loading of the completely used cartridge, partially used cartridge and the developed cartridge is inhibited. Then, the flow returns to step S701 shown in FIG. 25.

If a discrimination is made in step S729 that the recording mode selection switch 303a has been switched off, the photographing mode is set in step S729B and the flow proceeds to step S752 in which a discrimination is made whether or not the cartridge has been loaded. If no cartridge has been loaded, the flow returns to step S701 shown in FIG. 25. If the cartridge has been loaded, the flow proceeds to step S753. In step S753, the ordinary photographing process similar to that in step S513 shown in FIG. 20 is performed. After the process of step S753, the flow returns to step S701, if the cartridge is ejected.

According to the foregoing procedure, the ordinary photographing operation is permitted when the photographing mode is set. At this time, the state is maintained where the lockout hooks 318b to 318d are allowed to project into the cartridge chamber 351 and the hook 318a is retracted. As a result, loading of only the unused cartridge is permitted and loading of the completely used cartridge, the partially used cartridge and the developed cartridge is inhibited. Therefore, the completely used film and the partially used film can be protected from the erroneous double exposure.

If the recording mode has been selected, a state is realized where information recording operation is performed without performing photographing operation. The recording mode is composed of the external input mode and the internal processing mode. In the external input mode, information stored in the memory of another camera, such as the lens shutter camera 10 is received, and the received information is recorded on the film. As a result, information of each frame of a film exposed in another camera of a type having no magnetic head can be recorded on each frame of the film.

In particular, this embodiment is arranged in such a manner that all information items are reproduced after the recording operation has been completed, and the reproduced information of each frame is compared with the information of each frame stored in the memory 304. If the two information items do not agree with each other (if a recording error takes place), an alarm is issued and the re-recording operation is permitted. As a result, recording of an erroneous information is assuredly prevented.

If the internal processing mode is set in the recording mode, information recorded on the film can be changed. Specifically, information recorded on each frame is displayed and the user is, at this time, able to select whether or not the information is changed. If the change is selected, correction, addition and deletion of the information of the frame are permitted, and the changed information is stored in the memory 304. Then, the changed information is overwritten when the film is rewound. As described above, this embodiment enables the information recorded on the film to be changed, and therefore a significant convenience is realized when information is intended to be corrected or added or deleted.

If the foregoing recording mode is set, a state is realized where the lockout hooks 318b to 318d are retracted into the cartridge chamber 351 and the hook 318a is allowed to project into the same. As a result, loading of an unused cartridge is inhibited and loading of a completely used cartridge, an partially used cartridge and a developed cartridge is permitted. Therefore, recording of information on the completely used film, the partially used film and the developed film is permitted and erroneous recording of the information on the unused film can be prevented.

Figure 28:
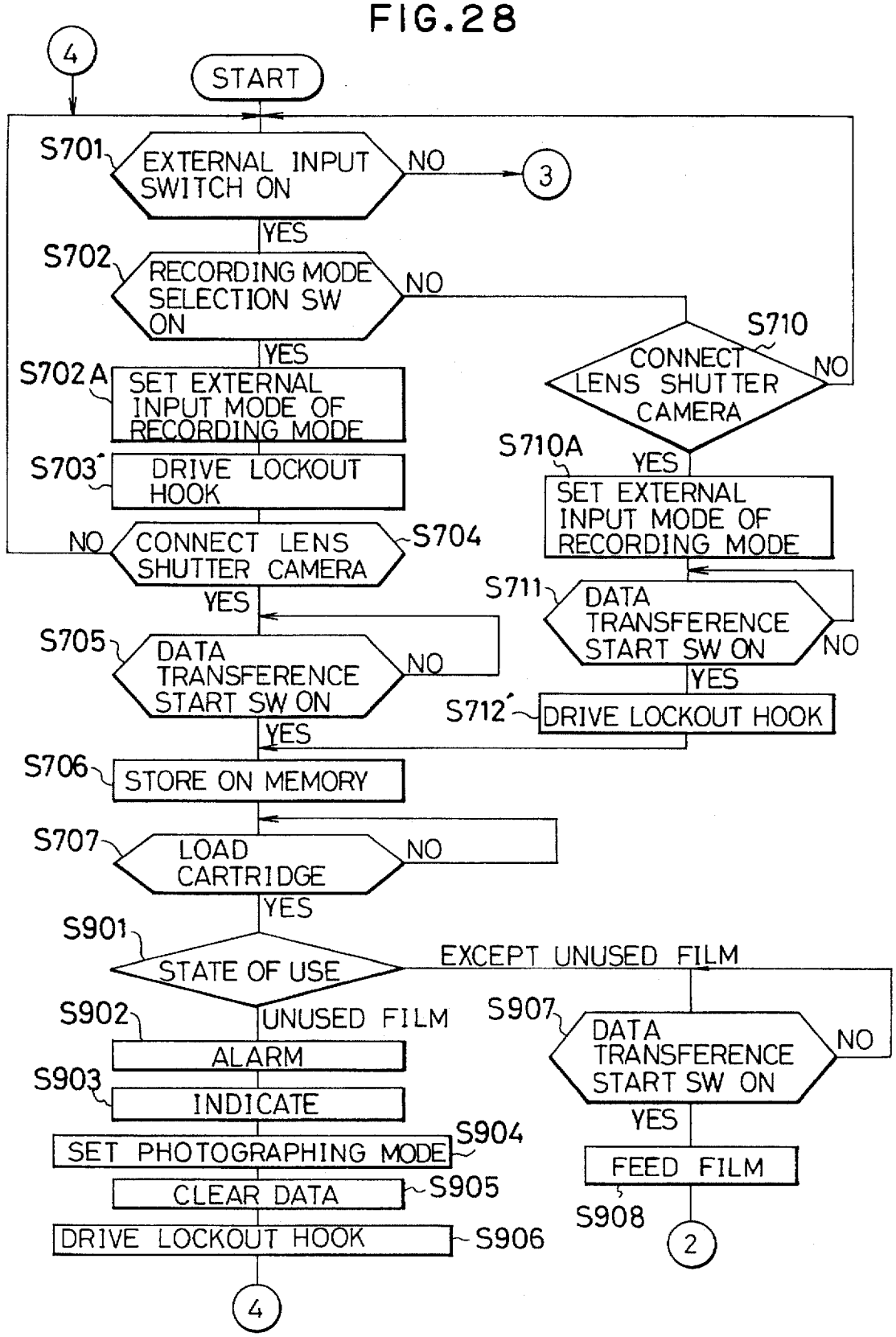
FIG. 28 is a flow chart which illustrates another embodiment to correspond to FIG. 25.

Referring to FIG. 28, another embodiment will now be described.

In this embodiment, loading of only the unused cartridge is permitted similarly to the foregoing embodiment when the photographing mode is being set, and all of loading of the unused cartridge, the partially used cartridge, the completely used cartridge and the developed cartridge are permitted when the recording mode is being set. However, loading of the unused cartridge in the state where the recording mode is being set will automatically change the mode to the photographing mode.

FIG. 28 is a flow chart corresponding to that shown in FIG. 8, wherein similar steps to those shown in FIG. 8 are given the same step Nos. and the description will be made about the different portions.

In steps S703' and S712', all lockout hooks 318a to 318d are retracted from the cartridge chamber 351. As a result, loading of any one of the unused cartridge, the partially used cartridge, the completely used cartridge and the developed cartridge is permitted.

In step S901, the state of use of the cartridge is discriminated in accordance with the output from the fork encoder 305. If the loaded cartridge is an unused cartridge, the flow proceeds to step S902 in which a fact that the unused cartridge has been loaded in the recording mode is alarmed with the buzzer 306. Further, the content of the alarm is, in step S903, displayed on the LCD 316. In step S904, the recording mode is canceled and the photographing mode is set. Then, the switch to the photographing mode is displayed on the LCD 316. In step S905, the information about photography supplied from the lens shutter camera 10 and stored on the memory 304 is cleared. In step S906, the lockout hooks 318b to 318d are allowed to project into the cartridge chamber 351 and the hook 318a is retracted. As a result, loading of only the unused cartridge is permitted and loading of the completely used cartridge, the partially used cartridge and the developed cartridge is inhibited. Then, the flow returns to step S701.

If a discrimination has been made in step S901 that the loaded cartridge is a cartridge except the unused cartridge, that is, it is any one of the partially used cartridge or the completely used cartridge or the developed cartridge, a moment the data recording start switch 303c is switched on is waited for in step S907. If the switch 303c is switched on, feeding of the film is commenced in step S908. Then, the flow proceeds to step S713 shown in FIG. 26.

The foregoing third and the fourth embodiments may be arranged in such a manner that the recording mode is automatically set when the partially used cartridge or the developed cartridge has been loaded. Although loading of only the unused cartridge is permitted when the photographing mode has been selected, loading of the partially used cartridge may be permitted.

Although each of the foregoing embodiments is arranged in such a manner that external information is received before the cartridge is loaded, the information may be received after the cartridge is loaded. Since the necessity is that information is recorded on a recording region of the film, the recording method is not limited to the magnetic recording method. For example, information may be recorded by an electric method or another method. As information to be recorded, following information may be used as well as the date of the photography, information about the exposure, and the focal distance: arbitrary characters (for example, characters denoting the place where the photography is performed) supplied by a user before performing the photographing operation; exposure completion information representing that the frame has been exposed. Although the foregoing description has been made about the examples in which the present invention is applied to the single lens reflex camera, the apparatus according to the present invention is not limited to the camera. It may be applied to an apparatus having only the function of recording information on the film. In a case that in place of the lens shutter camera, so-called film with a lens (included in the camera) to be supplied to a laboratory is used, the information recording function may be given to a developing machine in the laboratory. In this case, the film with a lens must have a memory for storing information. Although information in the camera is transmitted to the information recording apparatus through the connector, information may be transmitted by means of electric waves or infrared rays for example.

We claim:

1. An information recording apparatus adapted for use with a camera having a storage unit in which photographic information related to a photographic image for each frame of film has been stored, the storage unit being fixedly connected inside the camera, comprising:

a feeding unit for receiving the film on which the photographic image has been already recorded for each frame and for feeding the film within said information recording apparatus;

reading means;

a connector for connecting the camera and said reading means so that, when said information recording apparatus is activated, the reading means reads the photographic information from the storage unit;

a recording unit which records the photographic information on a recording region provided on the film for each frame;

information discriminating means for discriminating whether the photographic information read from the storage unit relates to information about the frame of the film loaded in said information recording apparatus; and recording control means for, when said information discriminating means discriminates that the read photographic information relates to information about the frame of the film, controlling said feeding unit so as to feed the film and controlling said recording unit so as to, in synchronization with feeding of the film, record the photographic information about each frame read by said reading means on the corresponding recording region of each frame of the film.

2. An information recording apparatus according to claim 1, wherein said recording unit is a magnetic recording unit which records the photographic information on magnetic tracks corresponding to frames of the film.

3. An information recording apparatus according to claim 1, wherein the photographic information recorded by said recording unit includes the date of the photography, the time of the photography, information about exposure, information about the focal distance of a photographing lens and character information supplied by a user.

4. An information recording apparatus according to claim 1, further comprising:

an indication drive unit which drives an indication unit disposed in a cartridge to indicate a state of use of the film;

use state discrimination means for discriminating the state of use of the film in said cartridge; and indication control means for controlling said indication drive unit so that said indication unit of said cartridge indicates a first indication state if a discrimination has been made by said use state discrimination means that all frames of the film have been exposed and said indication unit indicate a second indication state if a discrimination has been made that there is a non-exposed frame in the film.

5. An information recording apparatus according to claim 1, further comprising:

a reproducing unit which reproduces the photographic information by said recording unit on the recording regions corresponding to the frames of the film;

comparison means for comparing reproduced information with the photographic information stored in the internal storage unit to transmit a disagreement signal if the reproduced information and the stored photographic information do not agree with each other; and an alarm unit which issues an alarm in response to output of the disagreement signal.

6. An information recording apparatus according to claim 1, further comprising:

a reproducing unit which reproduces the photographic information recorded by said recording unit on the regions corresponding to the frames of the film;

comparison means for comparing reproduced information with the photographic information stored in said internal storage unit to transmit a disagreement signal if said reproduced information and the stored photographic information do not agree with each other; and a re-recording operating member to be operated so as to again perform information recording, wherein said recording control means controls said feeding unit and said recording unit so as to again perform information recording when said re-recording operating member is operated in a state where said disagreement signal has been transmitted.

7. An information recording apparatus according to claim 1, further comprising:

a reproducing unit which, in synchronization with feeding of the film, reproduces information previously recorded on the recording region of the film by the external recording unit, wherein said information discriminating means discriminates that the photographic information read from the external storage unit is not equal to the information about the frame of the film if the information about a predetermined frame reproduced by said reproducing unit is not included in the information about the predetermined frame read by said reading means.

8. An information recording apparatus according to claim 1, further comprising a loading inhibition unit which inhibits loading of a cartridge that accommodates an unused film.

9. An information recording apparatus adapted for use with a camera having a storage unit in which photographic information related to a photographic image for each frame of film has been stored, the storage unit being fixedly connected inside the camera, comprising:

a feeding unit which feeds the film on which the photographic image has been already recorded for each frame and which is loaded in said information recording apparatus;

reading means for reading the photographic information from the storage unit;

a recording unit which records the photographic information on a recording region provided on the film for each frame;

recording control means for controlling said feeding unit so as to feed the film and controlling said recording unit so as to, in synchronization with feeding of the film, record the photographic information about each frame read by said reading means on the corresponding recording region of each frame of the film;

a photographing lens;

an exposure control unit that introduces light of an object which has passed through said photographing lens to the film so as to perform exposure in response to a release operation;

mode setting means for setting one of a photographing mode and a recording mode in accordance with the operation of a mode operating member;

operation control means for, when the photographing mode is being set, operating said exposure control unit to perform a photographing process and operating said recording control means to record the photographic information on the frame exposed due to the photographing process, and when the recording mode is being set, operating said recording control means to record the photographic information read by said reading means on the recording region of the film without performing the photographing process;

a loading inhibition unit capable of switching between a first state where loading of a cartridge accommodating an unused film is permitted and loading of a cartridge accommodating a completely used film is inhibited and a second state where loading of a cartridge accommodating the unused film is inhibited and loading of a cartridge accommodating the completely used film is permitted; and a switch unit which maintains said loading inhibition unit at the first state when said photographing mode is being set and switches said loading inhibition unit to the second state when said recording mode is set, wherein said mode setting means sets the recording mode on condition that said reading means is able to read the photographic information from the storage unit even if the mode operation member has been operated to set the photographing mode, and cancels the recording mode and sets the photographing mode after completion of recording the photographic information of each frame on the film by said recording control means when the recording mode is being set.

10. An information recording apparatus according to claim 9, wherein said recording unit is a magnetic recording unit which records the photographic information on magnetic tracks corresponding to frames of the film.

11. An information recording apparatus according to claim 9, wherein the photographic information recorded by said recording unit includes the data of the photography, the time of the photography, information about exposure, information about the focal distance of a photographing lens and character information supplied by a user.

12. An information recording apparatus according to claim 9, wherein said recording mode includes an external input mode and an internal processing mode, and said recording control means controls said feeding unit and said recording unit when the external input mode is being set so that the photographic information supplied from the external storage unit is recorded on the recording region of the film, and controls said feeding unit and said recording unit when the internal processing mode is being set so that information about an instructed frame among the photographic information recorded on the recording regions of the film is changed in accordance with supplied contents of change.

13. An information recording apparatus adapted for use with a camera having a storage unit in which photographic information related to a photographic image for each frame of film has been stored, the storage unit being fixedly connected inside the camera, comprising:

a feeding unit for receiving the film on which the photographic image has been already recorded for each frame and for feeding the film within said information recording apparatus;

reading means;

a connector for connecting the camera and said reading means so that, when said information recording apparatus is activated, the reading means reads the photographic information from the storage unit;

an internal storage unit which stores the photographic information read by said reading means;

a recording unit which records the photographic information on a recording region provided on the film for each frame;

a reproducing unit which reproduces the photographic information recorded by said recording unit on the recording regions corresponding to the frames of the film;

comparison means for comparing reproduced information with the photographic information stored in said internal storage unit to transmit a disagreement signal if the reproduced information and the stored photographic information do not agree with each other;

an alarm unit which issues an alarm in response to output of disagreement signal;

a re-recording operating member to be operated so as to again perform information recording;

information discriminating means for discriminating whether the photographic information read from the storage unit relates to information about the frame of the film loaded in said information recording apparatus; and recording control means for, when said information discriminating means discriminates that the read information relates to information about the frame of the film, controlling said feeding unit and said recording unit so that, in synchronization with feeding of the film, the information for each frame stored in said internal storage unit is recorded on the corresponding recording region of each frame of the film, then operating said reproducing unit and said comparison means, and controlling said feeding unit and said recording unit to again perform information recording if said re-recording operating member is operated when the alarm is being issued in response to the disagreement signal.

14. An information recording apparatus according to claim 13, wherein said recording unit is a magnetic recording unit which records the photographic information on magnetic tracks corresponding to the frames of the film.

15. An information recording apparatus according to claim 13, wherein the photographic information recorded by said recording unit includes the date of the photography, the time of the photography, information about exposure, information about the focal distance of a photographing lens and character information supplied by a user.

* * * * *